US 6,307,879 B1

(12) United States Patent
Moriyama

(10) Patent No.: US 6,307,879 B1
(45) Date of Patent: *Oct. 23, 2001

(54) DIGITAL RADIO COMMUNICATION APPARATUS AND METHOD OF CONTROLLING THE SAME

(75) Inventor: Yukihiro Moriyama, Fukuoka (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/052,388

(22) Filed: Mar. 31, 1998

(30) Foreign Application Priority Data

Oct. 17, 1997 (JP) .................................................. 9-299593

(51) Int. Cl.[7] ................................ H04B 1/38; H04L 5/16
(52) U.S. Cl. ......................... 375/219; 375/224; 375/344; 375/345; 375/350
(58) Field of Search ................................... 375/224, 219, 375/220, 231, 232, 316, 344, 345, 350; 455/507, 524

(56) References Cited

U.S. PATENT DOCUMENTS

| | | | |
|---|---|---|---|
| 4,516,269 | * | 5/1985 | Krinock ............................. 375/230 |
| 5,497,396 | * | 3/1996 | Delprat ............................. 375/220 |
| 6,031,866 | * | 2/2000 | Oler et al. ......................... 375/219 |

OTHER PUBLICATIONS

Marvin E. Frerking, Digital Signal Processing in Communication Systems, Kluwer Academic Publishers, Dordrecht, The Netherlands, 1994.*

* cited by examiner

Primary Examiner—Don N. Vo
(74) Attorney, Agent, or Firm—Helfgott & Karas, P.C.

(57) ABSTRACT

A radio communication apparatus includes: a transmission unit for transmitting a radio wave; and a reception unit for receiving a radio wave and demodulating the same, the reception unit including: an analog filter provided in a first stage of the reception unit; a digital filter provided in a second stage of the reception unit so as to compensate a characteristic of the analog filter by having a filter characteristic of the digital filter varied by varying a tap factor; a test signal generation unit for supplying a test signal to the reception unit; an error state detection unit for detecting an error based on a digital demodulated signal derived from the test signal; and a tap factor setting unit for temporarily setting a tap factor of the digital filter that reduces a level of the error. Supplying of the test signal and detecting of the error are repeated until a target tap factor that minimizes the error is determined, whereupon the target tap factor is set in the digital filter.

22 Claims, 16 Drawing Sheets

(a)   (b)

(a)   (b)   (c)   (d)

(A) α = 0.8

(B) α = 0.5

(C) α = 0.2

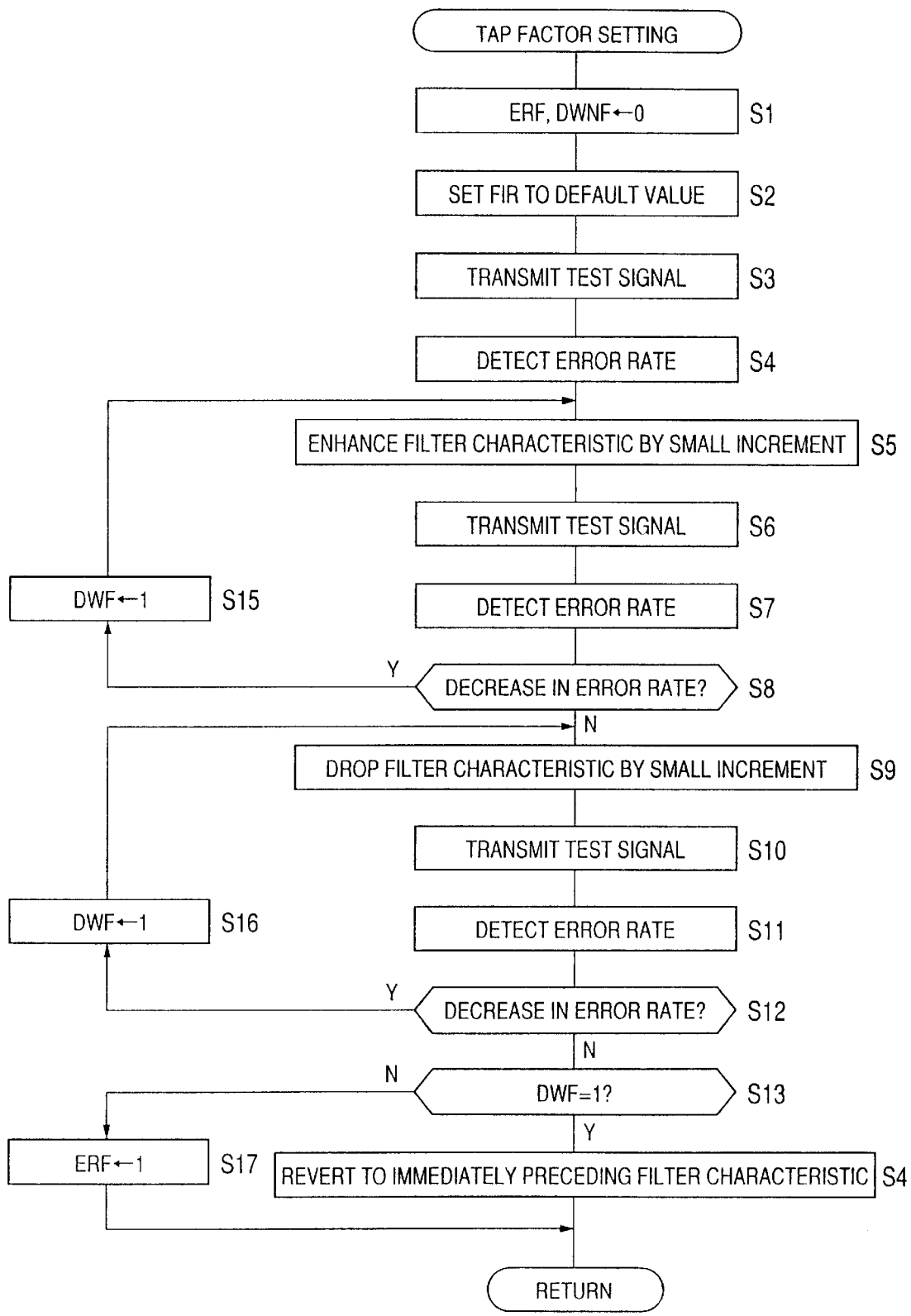

DIGITAL RADIO COMMUNICATION APPARATUS AND METHOD OF CONTROLLING THE SAME

BACKGROUND OF THE INVENTION

Field of the Invention

The present invention generally relates to digital radio communication apparatuses and, more particularly, to a digital mobile radio communication apparatus provided with an analog filter and a digital filter.

Recently, with the depletion of radio wave resources foreseen, the communication standards stipulate increasingly tight restriction of the use of a channel band width. Conventionally, such a restriction has been met by improving hardware elements and circuit technology. More specifically, the performance of an analog filter is improved for that purpose. As the requirements stipulated by the communication standards become more strict, it is demanded that a software approach be introduced to implement a digital filter or to complement the performance of an analog filter.

FIGS. 1–5 illustrate the technology used in a digital radio communication apparatus according to the related art.

FIG. 1A shows a model of a digital radio transmission system. Referring to FIG. 1A, $T_b(\omega)$ indicates a low-pass filter characteristic of a transmission unit, $T_r(\omega)$ indicates a band-pass filter characteristic, $F_r(\omega)$ indicates a transfer characteristic of a transmission path (air), $R_r(\omega)$ indicates a band-pass filter characteristic of a receiver, and $R_b(\omega)$ indicates a low-pass filter characteristic of the receiver. An overall transfer characteristic $H(\omega)$ is given by $$H(\omega) = T_b(\omega) T_{rb}(\omega) F_{rb}(\omega) R_{rb}(\omega) R_b(\omega),$$

where $T_{rb}(\omega)$ indicates an equivalent low-pass filter characteristic of $T_r(\omega)$, $F_{rb}(\omega)$ indicates an equivalent low-pass filter characteristic of $F_r(\omega)$ and $R_{rb}(\omega)$ indicates an equivalent low-pass filter characteristic of $R_r(\omega)$ When such a transmission system is to transmit a pulse signal $G(\omega)$ from a signal source, an input waveform for a discrimination circuit is given by $$r(t) = \frac{1}{2\pi} \int_{-\infty}^{\infty} G(\omega) H(\omega) e^{j\omega t} d\omega \tag{1}$$

FIG. 1B shows an eye pattern of an input waveform for the discrimination circuit. Assuming that the signal source transmits a π/4-shifted PSK modulated signal, there is no intersymbol interference occurring in the input waveform of the discrimination circuit if $H(\omega)$ satisfies the Nyquist condition. The eye aperture is open ((a) of FIG. 1B). However, if the Nyquist condition fails to be satisfied due to a variation of the performance of filter elements that has occurred in the process of fabrication, or due to a variation in the operating conditions (temperature, power-supply voltage, etc.), intersymbol interference occurs so that the eye aperture begins to close ((b) of FIG. 1B).

FIG. 1C shows a constellation (arrangement of codes) that illustrates the above-described relation. Generally, code points on the transmitting side ((a) of FIG. 1C) vary (are displaced) in the air as shown in (b) of FIG. 1C before arriving at the receiving side. If the combination of filters on the receiving side satisfies the Nyquist condition, the variation in the air settles to a state as shown in (c) of FIG. 1C at a discrimination point. That is, the intersymbol distance H at the discrimination point is relatively large. However, if there is a deviation in the filter characteristic on the reception side, intersymbol interference occurs so that it is impossible to properly restore the code points ((d) of FIG. 1C). That is, the intersymbol distance H at the discrimination point is relatively small.

FIG. 2 shows a relation between a cosine roll-off factor a and the constellation in the air. FIG. 2A shows the relation that occurs when α=0.8; FIG. 2B shows the relation that occurs when α=0.5; and FIG. 2C shows the relation that occurs when α=0.2. The smaller the factor α, the smaller the occupied bandwidth so that the more preferable it is in terms of efficient use of the bandwidth. Accordingly, α tends to be controlled to maintain it at low level in current digital communication systems. However, the constellation in the air deviates from that of the point of origination as the level of α is lowered, requiring precise control of the receiver filter in order to restore the constellation.

Conventionally, in order to construct a receiver with a strict requirement for selectivity between adjacent channels, a high-performance analog filter formed of crystal or ceramic is used.

FIG. 3A shows a characteristic of attenuation of an analog filter with respect to frequency. Generally, in order to obtain a large attenuation, a plurality of analog filters are connected in multiple stages so as to produce a high performance (large attenuation). Such an approach causes the number of required elements to increase, and increases the size and cost of the resultant apparatus.

FIG. 3B shows a group delay characteristic of an analog filter with respect to frequency. The delay time of a signal varies with respect to the frequency. Therefore, connecting a plurality of analog filters to form multiple stages in an attempt to obtain a high-attenuation characteristic causes degradation in the group delay characteristic.

Further, a characteristic of analog elements is subject to a variation that occurs in the process of production. The characteristic also varies significantly with time and due to a variation in the operating conditions (temperature, power-supply voltage, etc.). Thus, it is difficult to implement and maintain the precise Nyquist characteristic.

According to one approach, an analog filter designed to eliminate out-of-band noise is used in the first stage, several stages of the receiving system are linearized, and the majority of the filter performance (the Nyquist characteristic, the attenuation characteristic, etc.) is implemented (covered) by the digital filter in a subsequent stage.

FIG. 4 shows a construction of a digital radio communication apparatus (portable terminal) according to the related art. The digital radio communication apparatus comprises an antenna 1; a transmission/reception branching switch 2 (C); a transmitter 3, a frequency synthesizer 4 (SYN), a receiver 5, including an RF amplifier (RFA) 6, a first mixer (x) 7, a second mixer 9 (x), analog band-pass filters (BPF) 8, 10, 12 formed of crystal or ceramic, IF amplifiers (IFA) 11, 13, a quadrature detecting unit (QDT) 14 using the QPSK system, an A/D converter (A/D) 15, adaptive transversal filters 16, 17 using a digital system, a discriminating circuit (DSC) 18, a clock generator (CG) 19, an automatic frequency controller (AFC) 20, a voltage controlled oscillator (VCO) 21, and an automatic gain controller (AGC) 25.

CG 19 generates (reproduces) a sampling clock signal SK and a data clock signal DK based on the edges of demodulated I/Q signals. AFC 20 detects frequency deflection of the IF signal based on the edges of the demodulated I/Q signals. An output of AFC 20 is input to DSC 18 and used in control of a discriminated phase (phase rotation by π/4-shifted QPSK and the like). The output of AFC 20 is input to VCO 21 and used to maintain the frequency of the IF signal at a regular level.

Further, the digital radio communication apparatus comprises a TDMA synchronization controller 31 for controlling timings according to the TDMA system; a codec (CODEC) 32 for converting a sound signal into codes; a baseband processor (BBP) 33 of the sound signal; a microphone (MIC) 34; a speaker (SPK) 35; a CPU 41 for performing main control (console control and call control including location registration, standby, call origination, call incoming, and handover) of the apparatus; a main memory (MM) 42 embodied by a RAM, a ROM and an EEPROM or the like for storing control programs executed by the CPU 42 and associated data; a console unit (CSL) 43 operated by a user, including a display unit 44 embodied by a liquid crystal or the like for displaying dial numbers and messages, and a keyboard (KBD) 45 provided with dial keys; and function keys, and a common bus 46 for the CPU 41.

The CPU 41 controls incoming and outgoing calls via the TDMA synchronization controller 31. In a call state, in which a call can proceed with respect to a destination terminal, the sound signal from the MIC 34 is sampled by the BBP 33 and converted thereby into PCM data. The CODEC 32 converts the output of the BBP 33 into code data. The TDMA synchronization controller 31 formats the output of the CODEC 32 to produce transmitted data TD. The transmitter 3 modulates the transmitted data TD into a π/4-shifted QPSK signal for transmission via the antenna 1.

The wave received by the antenna 1 is amplified by the RFA 6 and converted by the mixers 7 and 9 so as to produce a first IF signal and a second IF signal, respectively. IFAs 11, 13 and AGC 25 amplify the IF signals to have a predetermined level. The IF signals are subject to quadrature detection by ODT 14 to produce quadrature detection signals I and Q. The detection signals I and Q are subject to A/D conversion by A/D 15. ATFs 16 and 17 convert the signals I and Q into reproduced signals I and Q having minimum errors $\epsilon_i$ and $\epsilon_q$, respectively, with respect to the code points. The reproduced signals I and Q are subject to discrimination by DSC 18 so as to produce received data RD. The received data RD is input to the TDMA synchronization controller 31 where code data of the sound is retrieved. The code data is converted into PCM data by the CODEC 32. The PCM data is converted into the sound signal and audibly output by SPK 35.

FIG. 5 shows a construction of an adaptive transversal filter according to the related art. The adaptive transversal filter comprises an adaptive transversal filter (ATF) 16/17, including a tap factor operator 16A, and a FIR (finite impulse response) filter 16B, and consisting of a delay circuit ($Z^{-1}$) 16a, a multiplier (x) 16b, and an adder (Σ) 16c; and a discrimination unit (DSC) 18, including a discrimination circuit 18a for code points, and an error detection unit 18b.

An output $y_j$ of the FIR filter 16B is given by $$y_j = \sum_{i=0}^{N} a_{ij} x_{j-i} \qquad (2)$$

$$= a_{0j} x_{j-0} + a_{1j} x_{j-1} + \ldots + a_{Nj} x_{j-N}$$

$$= A_j^T X_j$$

where a tap (weight) factor vector $A_j = [a_{0j}, a_{ij}, \ldots, a_{Nj}]^T$, and an input signal vector $X_j = [x_j, x_{j-1}, \ldots, x_{j-N}]^T$.

The discrimination circuit 18a compares the output $y_j$ with a code point $d_j$ so as to produce reproduced data RD closest to the code point $d_j$. The error detection unit 18b compares the output $y_j$ with the code point $d_j$ so as to produce an error signal $\epsilon_j = d_j - y_j$ $(= d_j - A_j^T x_j)$. The tap factor operator 16A obtains an optimum tap factor vector $A_{j+1} = [a_{0j+1}, a_{1j+1}, \ldots, a_{Nj+1}]^T$ which causes the square of the error $\epsilon_j^2$ to have a minimum value.

The optimum tap factor vector $A_{j+1}$ is obtained at the next instant using the weight vector method of Wiener. However, this method requires complex, large-volume operations to be carried out so that real-time processing, by a DSP or the like, is impossible when the number of taps N is increased. Accordingly, the LMS (least mean square) method is generally used to obtain a step-by-step approximation of the optimum tap factor vector $A_{j+1}$. The LMS method is also called the steepest descent method. The tap factor vector $A_{j+1}$ for the next instant is given by $$A_{j+1} = A_j - \mu \nabla_j$$

where $\mu$ indicates a parameter for controlling a convergence speed/stability, and $\nabla_j$ indicates an instantaneous gradient.

The instantaneous gradient $\nabla_j$ is given by $$\nabla_j = \left\{ \frac{\partial \epsilon_j^2}{\partial a_0}, \frac{\partial \epsilon_j^2}{\partial a_1}, \cdots, \frac{\partial \epsilon_j^2}{\partial a_N} \right\}^T_{A=A_j} \qquad (3)$$

$$= 2\epsilon_j \left\{ \frac{\partial \epsilon_j}{\partial a_0}, \frac{\partial \epsilon_j}{\partial a_1}, \cdots, \frac{\partial \epsilon_j}{\partial a_N} \right\}^T_{A=A_j}$$

$$= -2\epsilon_j \left\{ \frac{\partial A_j^T X_j}{\partial a_0}, \frac{\partial A_j^T X_j}{\partial a_1}, \cdots, \frac{\partial A_j^T X_j}{\partial a_N} \right\}^T_{A=A_j}$$

$$= -2\epsilon_j \{x_{j-0}, x_{j-1}, \cdots, x_{j-N}\}^T$$

$$= -2\epsilon_j X_j$$

Accordingly, the following relation holds.

$$A_{j+1} = A_j + 2\mu \epsilon_j X_j$$

where the parameter $\mu$ is appropriately set. When $\epsilon_j = 0$, $A_{j+1} = A_j$ indicates an optimum tap factor vector.

A combination of the analog filter and the adaptive transversal filter as described above can be adapted for variations of the transmission path characteristic H(ω).

However, if the adaptive transversal filter is used, it is necessary to obtain a next-instant tap factor vector $A_{j+1}$ for each symbol received, thus imposing a heavy load on the tap factor operator 16A. While the number of taps N need to be large in order to obtain a high-attenuation characteristic using the digital filter, the processing speed of a DSP or the like presents a bottleneck.

When the LMS method is used, the adaptive process starting with an initial vector $A_0$ is such that, if the level of $\mu$ is low, the adaptive process proceeds with substantially no oscillation so that the optimum factor to produce the minimum value of $\epsilon_j^2$ is obtained smoothly. However, the convergence speed is low. If, on the other hand, $\mu$ is high, each of the adaptive steps goes too "far", causing an oscillation before arriving at the point that produces the minimum value of $\epsilon_j^2$. In this case, while the convergence speed is high, there is a likelihood that divergence may take place. That is, if the adaptive transversal filter is used, the receiving system might be instable.

The adaptive transversal filter is designed to minimize an error power $\epsilon_j^2$ with respect to the code point. With the adaptive transversal filter, it is impossible to know which of the characteristics of the filter of the receiving system (roll-off characteristic, attenuation characteristic, group delay characteristic, phase characteristic, etc.) is improved.

In other words, it is impossible to compensate and control a specific characteristic of the filter of the receiving system.

SUMMARY OF THE INVENTION

Accordingly, a general object of the present invention is to provide a digital radio communication apparatus and a method of controlling the same in which the aforementioned problems are eliminated.

Another and more specific object of the present invention is to provide a digital radio communication apparatus and a method of controlling the same in which the characteristic of the analog filter is adaptively compensated by the digital filter, and in which the compensated characteristic is identified and selected.

Still another object of the present invention is to provide a digital radio communication apparatus in which it is possible to control a selected characteristic.

The aforementioned objects can be achieved by a digital radio communication apparatus comprising: a transmission unit for transmitting a radio wave; and a reception unit for receiving a radio wave and demodulating the same, the reception unit comprising: an analog filter provided in a first stage of the reception unit; a digital filter provided in a second stage of the reception unit so as to compensate a characteristic of the analog filter by having a filter characteristic of the digital filter varied by varying a tap factor; an RF signal terminal for inputting and outputting a test RF signal; a tap factor terminal for inputting and outputting a tap factor of the digital filter; and a digital demodulated signal terminal for inputting and outputting a digital demodulated signal produced by the reception unit.

According to the controlling method of the present invention, by compensating the characteristic of the analog filter using the digital filter with the variable filter characteristic, a predetermined (regular) characteristic of the receiving system as a whole is obtained in the presence of a variation of the characteristic of the analog filter. By providing a characteristic controlling terminal (connector or the like), it is easy to produce a desired characteristic using an external controlling apparatus. Accordingly, the yield of the analog filter is improved. In addition to the benefit of ease of adjustment, the benefit of significant reduction in cost is provided.

The aforementioned objects can also be achieved by a method of controlling a digital radio communication apparatus, comprising the steps of; a) supplying a test RF signal to an RF signal terminal of a reception unit; b) detecting an error occurring in a digital demodulated signal derived from the test RF signal; c) temporarily setting a tap factor of a digital filter that reduces a level of the error; d) repeating steps a)–c) so as to determine a target tap factor that minimizes the error, and setting the target tap factor in the digital filter.

According to this aspect of the invention, it is relatively easy to set an optimum tap factor that produces a minimum level of error in the reception output.

In further accordance with the invention, the error may be related to one of the following: a bit error rate of a digital reproduced signal; degradation in an eye pattern of a digital demodulated baseband signal; and deviation from code points of the digital demodulated baseband signal.

According to this aspect of the invention, it is possible to set intersymbol interference to a minimum level by controlling a bit error rate, degradation in an eye pattern, or deviation from code points.

The aforementioned objects can also be achieved by a digital radio communication apparatus comprising: a transmission unit for transmitting a radio wave; and a reception unit for receiving a radio wave and demodulating the same, the reception unit comprising: an analog filter provided in a first stage of the reception unit; a digital filter provided in a second stage of the reception unit so as to compensate a characteristic of the analog filter by having a filter characteristic of the digital filter varied by varying a tap factor; a test signal generation unit for supplying a test signal to the reception unit; an error state detection unit for detecting an error based on a digital demodulated signal derived from the test signal; and a tap factor setting unit for temporarily setting a tap factor of the digital filter that reduces a level of the error; wherein supplying of the test signal and detecting of the error are repeated until a target tap factor that minimizes the error is determined, whereupon the target tap factor is set in the digital filter.

According to this aspect of the invention, by building facilities for controlling the reception unit characteristic in the apparatus, setting of an optimum tap factor can be performed not only in the process of fabrication but also while the apparatus is being used. Accordingly, the variation of the characteristic of the analog filter occurring in the fabrication process, the variation due to the operating conditions (temperature, power-supply voltage and the like), and the variation with time can be appropriately compensated. Thus, the characteristic of the reception unit can be maintained at optimum levels.

The transmission unit may subject a data signal originated in the digital radio communication apparatus to digital modulation before transmission, and a test data signal generated by the test signal generation unit may be subjected to digital modulation via the transmission unit and supplied to an RF signal terminal of the reception unit.

Accordingly, the transmission unit within the device can be efficiently used, and a similar transfer characteristic $T(\ )=T_b(\ )T_r(\ )$ of a transmission unit in a transfer system model can be simulated.

The aforementioned objects can also be achieved by a digital radio communication apparatus comprising: a transmission unit for transmitting a radio wave; and a reception unit for receiving a radio wave and demodulating the same, the reception unit comprising: an analog filter provided in a first stage of the reception unit; a digital filter provided in a second stage of the reception unit so as to compensate a characteristic of the analog filter by having a filter characteristic of the digital filter varied by varying a tap factor; an error state detection unit for detecting an error based on a digital demodulated signal from the reception unit; and a tap factor setting unit for temporarily setting a tap factor of the digital filter that reduces a level of the error; wherein setting of the tap factor and detecting of the error are repeated until a target tap factor that minimizes the error is determined, whereupon the target tap factor is set in the digital filter.

According to this aspect of the invention, the error state detection unit detects a predetermined error state based on a digital demodulated signal (signal received in communication) produced in the reception unit. Thus, the error state can be monitored on a continuous basis without generating a test signal. The reception state of the apparatus can be optimized according to the result of monitoring.

The digital radio communication apparatus may further comprise a call controller for controlling incoming calls and outgoing calls, wherein said call controller provides facilities of one of the test signal generation unit and said error state detection unit.

Generally, the call controller handles call control signals via the transmission unit and the reception unit and is provided with data transmission facilities and data reception facilities. By providing the call controller with test signal generating facilities so that the call controller can generate a test signal using an unoccupied time during communication, a test signal generation unit can be omitted. By causing the call controller to detect an error state (bit error rate) of the received data, the error state detection unit can be omitted.

In further accordance with the invention, an algorithm for optimizing said digital filter by said tap factor setting unit may be based on a principle of perturbation.

The perturbation principle operates such that a tap factor is temporarily set on a trial and error basis, the result of setting is evaluated so as to control the temporary setting to produce the best evaluation until the optimum tap factor is finally determined. Thus, the optimum tap factor is arrived at according to a simple process involving determination and control.

In further accordance with the invention, the error may be related to one of the following: a bit error rate of a digital reproduced signal; degradation in an eye pattern of a digital demodulated baseband signal; and deviation from code points of the digital demodulated baseband signal.

According to this aspect of the invention, it is possible to set intersymbol interference to a minimum level by controlling a bit error rate, degradation in an eye pattern, or deviation from code points.

The tap factor of said digital filter may be to compensate one or a plurality of the following characteristics: a roll-off characteristic of said analog filter; an attenuation characteristic of said analog filter; a group delay characteristic of said analog filter; and a phase characteristic of said analog filter.

According to this aspect of the invention, unlike the related art wherein the adaptive transversal filter is used, the characteristic that needs compensating can be selected. Also, it is relatively easy to determine whether the compensation takes effect.

In further accordance with the invention, a plurality of tap factors may be stored in a memory.

A specification, simulation or experiment may be used to determine a plurality of typical analog filter characteristics adapted for a variation of the characteristic of the analog filter. By retrieving typical characteristics, tap factors for compensating the same can be determined and stored in a memory. By storing a plurality of such tap factors and by sequentially reading out the tap factors in accordance with the adaptive control so as to temporarily set the tap factor, optimization control of the filter characteristic can be easily performed.

In further accordance with the invention, a digital signal processor may implement facilities of said digital filter and facilities of the memory storing the plurality of tap factors.

By using a DSP, various filter characteristics can be flexibly generated. For example, the number of effective taps may be increased or decreased appropriately. Since the tap factor of the digital filter of the invention is not changed at reception (that is, not changed every time a symbol is received), no restriction is imposed on the signal processing time even if the number of effective taps is increased.

A program control of the digital signal processor may implement facilities of said error state detection unit and facilities of said tap factor setting unit.

According to this aspect of the invention, the error state (bit error rate, eye pattern degradation, deviation from code points) can be detected by programmable control without a need for hardware expansion. Also, high-quality optimization control of the filter characteristic can be easily implemented.

The aforementioned objects can also be achieved by a digital mobile radio communication apparatus for performing communication via a base station of a digital mobile communication system, said digital mobile radio communication apparatus comprising: a transmission unit for transmitting a radio wave; and a reception unit for receiving a radio wave and demodulating the same, said reception unit comprising: an analog filter provided in a first stage of said reception unit; a digital filter provided in a second stage of said reception unit so as to compensate a characteristic of said analog filter by having a filter characteristic of said digital filter varied by varying a tap factor; and a variable tap count control unit for variably controlling the number of effective taps of said digital filter depending on conditions that occur in communication.

For example, when an adjacent channel (frequency channel) for a mobile station is not being used, the attenuation of the filter may be reduced (that is, the number of effective taps may be decreased) so as to reduce the operation load on the DSP and decrease the delay in the received and reproduced signal. When the adjacent channel is being used, the attenuation of the filter may be increased (that is, the number of effective taps may be increased) so as to remove jamming from the adjacent channel.

In a type of use in which a response is returned between a base station and a mobile station in a short period of time, the number of effective taps of the FIR filters 22, 23 is decreased so that the delay in the received and reproduced signal is improved to enable quick responses to occur.

In further accordance with the invention, the variable tap count control unit may variably control the number of effective taps of said digital filter in accordance with a control signal from the base station.

According to this aspect of the invention, since the base station (network side) keeps track of the channel usage state within a service area, the variable tap number facilities of the mobile station can be smoothly operated. The base station can control the performance of the mobile station in the order of priority. For example, the control of the mobile station by the base station may be based on the order of processing speed. Alternatively, if the processing speed is not a concern, the control may be based on the order of jamming removal capability.

The variable tap count control unit may temporarily reduce attenuation provided by said digital filter with respect to an adjacent channel so as to detect a current reception state, and update the number of effective taps of said digital filter depending on a result of the detection.

Since the digital filter can easily modify the attenuation with respect to the adjacent channel, it is easy to determine whether the adjacent channel is being used. Detection of the reception state is preferably performed in an unoccupied time during communication (in the case of TDMA, in unoccupied time slots).

The digital mobile radio communication apparatus may further comprise a monitoring control unit for monitoring a usage of a bandwidth for an adjacent channel, using unoccupied time in communication, wherein said variable tap count control unit may update the number of effective taps of said digital filter depending on a result of the monitoring by said monitoring control unit.

The aforementioned objects can also be achieved by a digital mobile radio communication apparatus for performing communication via a base station of a digital mobile communication system, and for directly communicating with another digital mobile radio communication apparatus, in a location outside an area served by the base station, said digital mobile radio communication apparatus comprising: a transmission unit for subjecting data originating in said digital mobile radio communication apparatus to digital modulation; and a reception unit for receiving a digitally-modulated radio wave and demodulating the same, said transmission unit comprising a first digital filter having a filter characteristic variable depending on transmission data by varying a tap factor, and said reception unit comprising: an analog filter provided in a first stage of said reception unit; a second digital filter provided in a second stage of said reception unit so as to compensate a characteristic of said analog filter by having a filter characteristic of said second digital filter varied by varying a tap factor; wherein said digital mobile radio communication apparatus comprises a variable roll-off factor control unit for variably controlling a roll-off characteristic of said first and second digital filters depending on conditions occurring in communication.

In such a digital mobile communication system, when mobile stations communicating with each other leave a service area of the base station, the mobile stations begin to communicate with each other with a proprietary frequency precision (which is lower than the precision provided by the base station). Deviation from the target transmission frequency may be such that other channels may receive jamming. According to the above aspect of the invention, the roll-off characteristic of the first and second digital filters is variably controlled so that jamming with respect to other channels is reduced and the communication between the mobile station that left the service area can proceed properly.

The variable roll-off factor control unit may variably control the roll-off characteristic of said first and second digital filters in accordance with a control signal exchanged between two digital mobile radio communication apparatuses communicating with each other, so as to produce a desired matching state of the roll-off characteristic.

By exchanging control signals between the mobile stations communicating with each other, jamming with respect to other channels is successfully prevented and the roll-off characteristic that occurs between the two mobile stations is maintained at a desired matching state.

The digital mobile radio communication apparatus may further comprise a reception level detection unit for detecting a reception level of a digital demodulated wave, wherein said variable roll-off factor control unit may variably control the roll-off characteristic of said first and second digital filters depending on the reception level detected by said reception level detection unit.

For example, when the reception level is relatively high, it means that the distance between the two stations is small. In this case, the roll-off factor a of the first and second digital filters is reduced so that the purpose of reducing the jamming with respect to other channels is best served. When the reception level is low, it means that the distance between the two stations is large. In this case, the roll-off factor a of the first and second digital filters is increased so that the purpose of maintaining communication between the two stations is best served.

BRIEF DESCRIPTION OF THE DRAWINGS

Other objects and further features of the present invention will be apparent from the following detailed description when read in conjunction with the accompanying drawings, in which:

FIG. 9 is a flowchart for controlling a reception characteristic according to the first embodiment;

DETAILED DESCRIPTION OF THE PREFERRED EMBODIMENTS

Figure 1A:
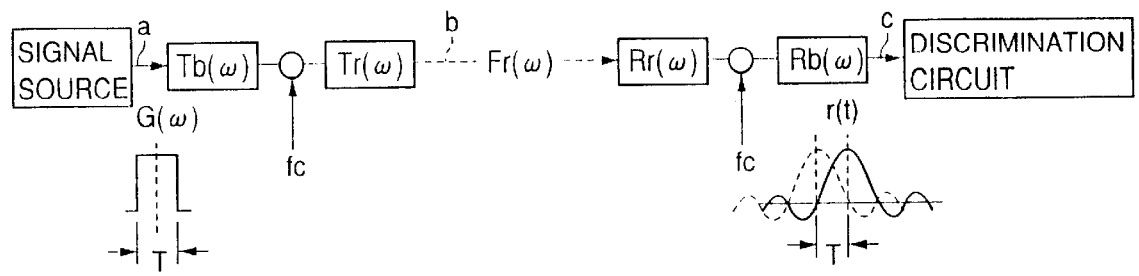
FIG. 1A shows a model of a digital radio transmission system.
Figure 1B:
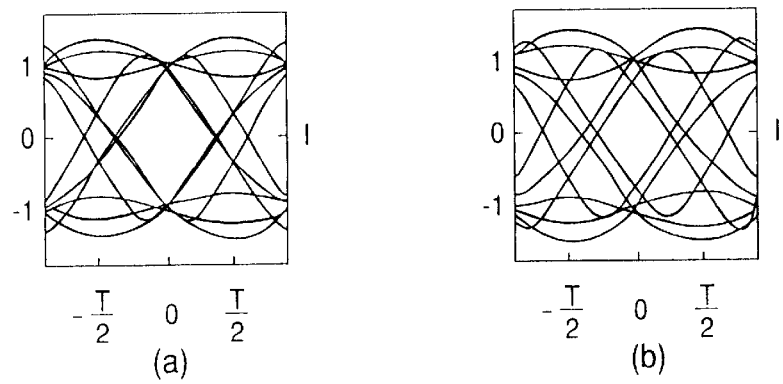
FIG. 1B shows an eye pattern of an input waveform for the discrimination circuit.
Figure 1C:
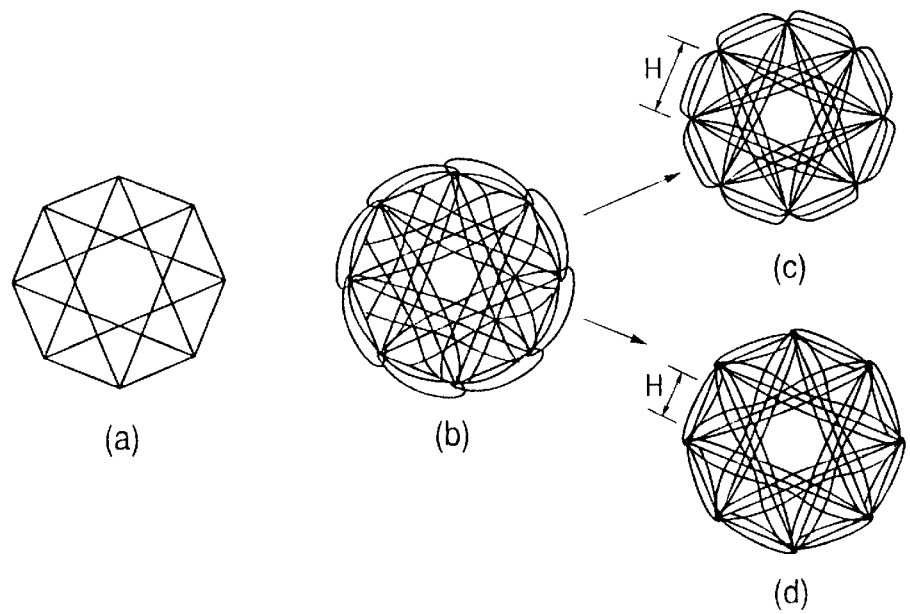
FIG. 1C shows a constellation that illustrates how intersymbol interference occurs.
Figure 2A:
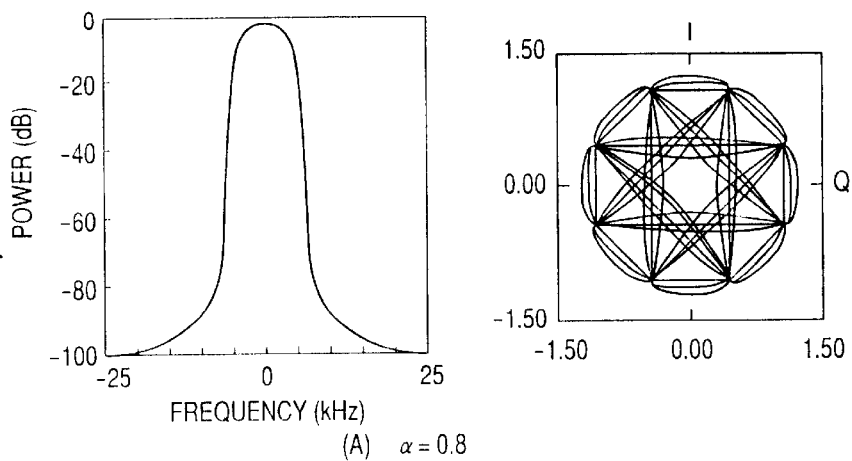
FIG. 2A shows a relation between a cosine roll-off factor a and the constellation in the air occurring when $\alpha=0.8$.
Figure 2B:
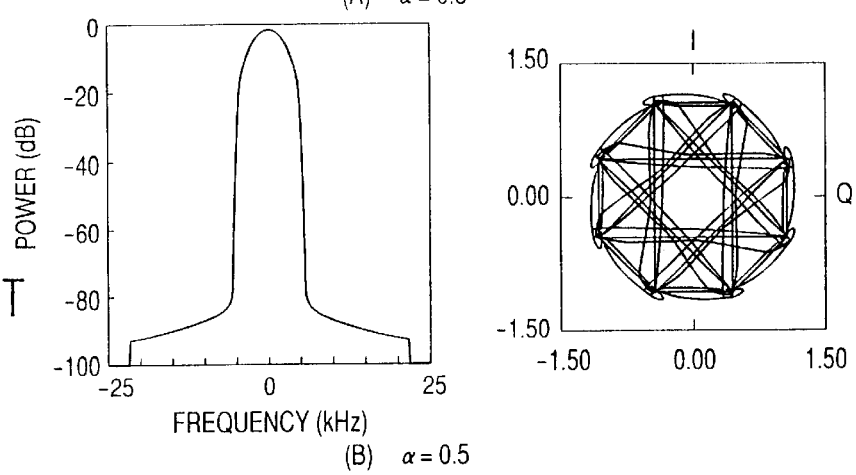
FIG. 2B shows a relation between a cosine roll-off factor a and the constellation in the air occurring when $\alpha=0.5$.
Figure 2C:
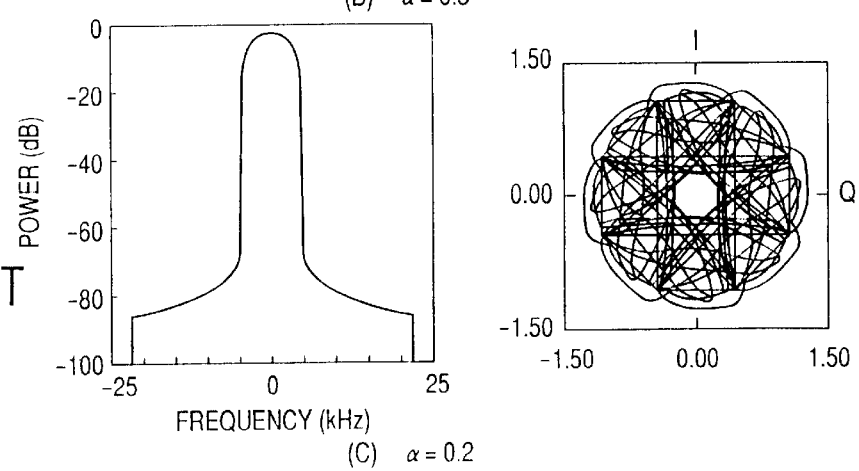
FIG. 2C shows a relation between a cosine roll-off factor a and the constellation in the air occurring when $\alpha=0.2$.
Figure 3A:
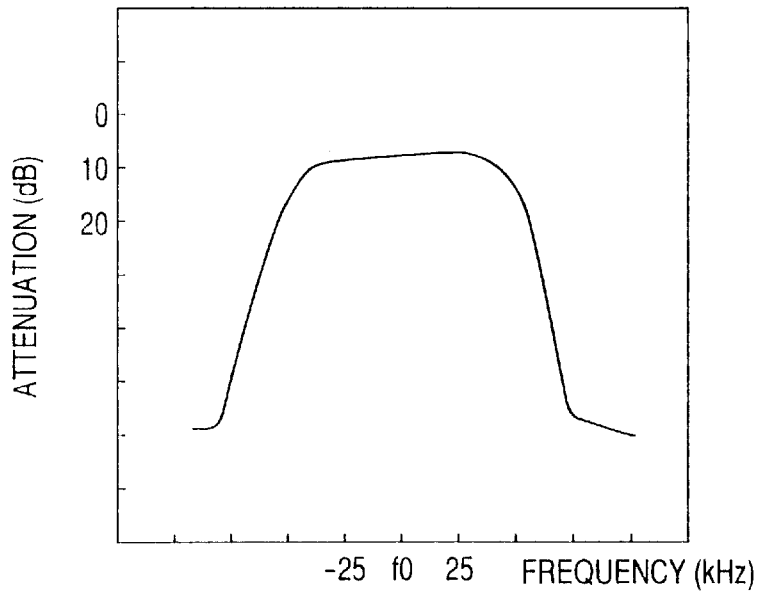
FIG. 3A shows a characteristic of attenuation of an analog filter with respect to frequency.
Figure 3B:
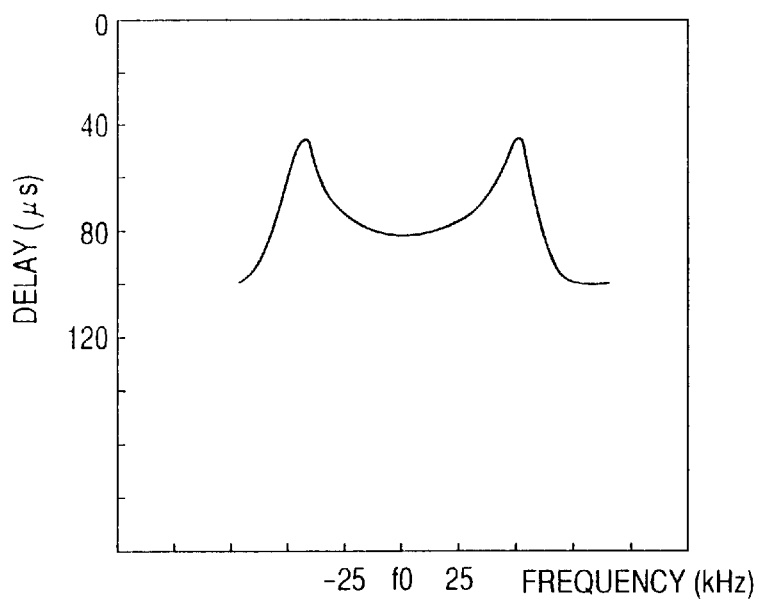
FIG. 3B shows a group delay characteristic of an analog filter with respect to frequency.

In the drawings, those components that are identical to each other are designated by the same reference numerals.

Figure 6:
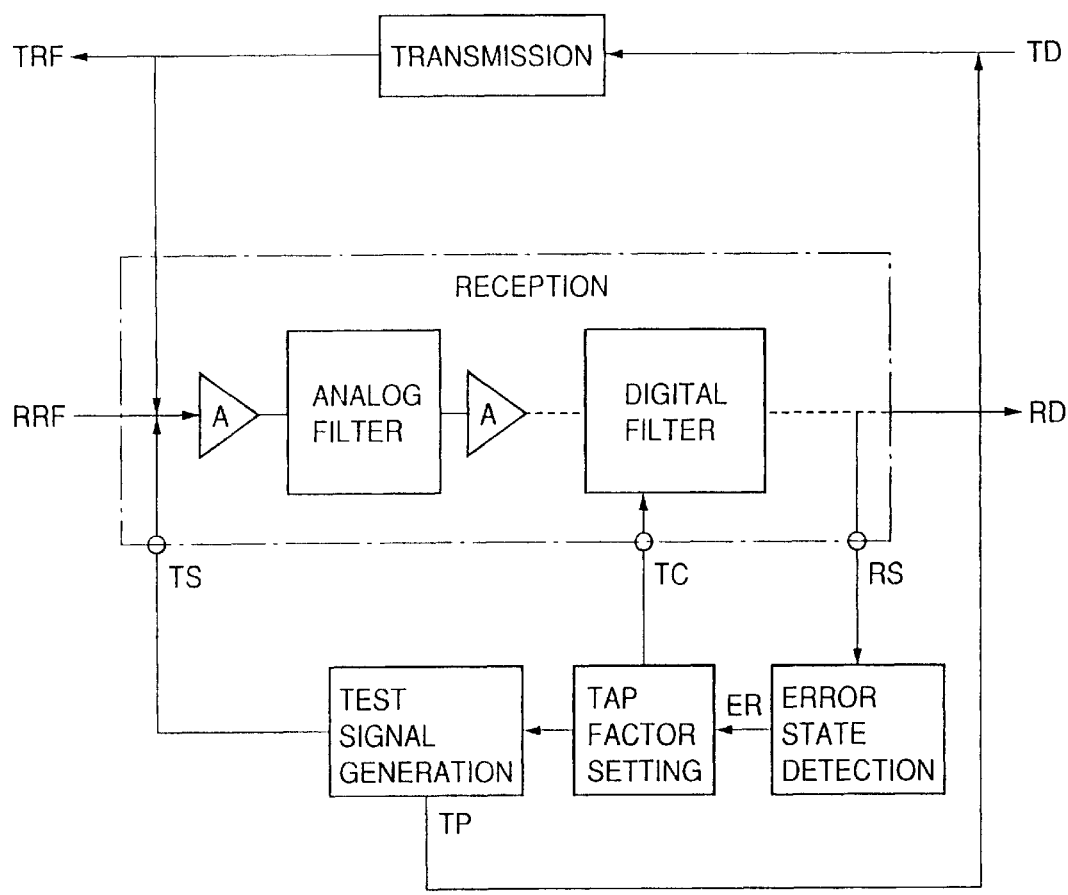
FIG. 6 shows an operating principle of the present invention.

FIG. 6 shows a principle of the present invention. The digital radio communication apparatus according to the invention comprises a transmission unit, and a reception unit. The first stage of the reception unit includes an analog filter, and the second stage thereof includes a digital filter which, with a variable tap factor and a resultant variable filter characteristic, compensates the characteristic of the analog filter. The apparatus also comprises a terminal for a test RF signal TS, a terminal for a digital filter tap factor TC, and a terminal for a digital demodulated signal RS from the reception unit.

Figure 7:
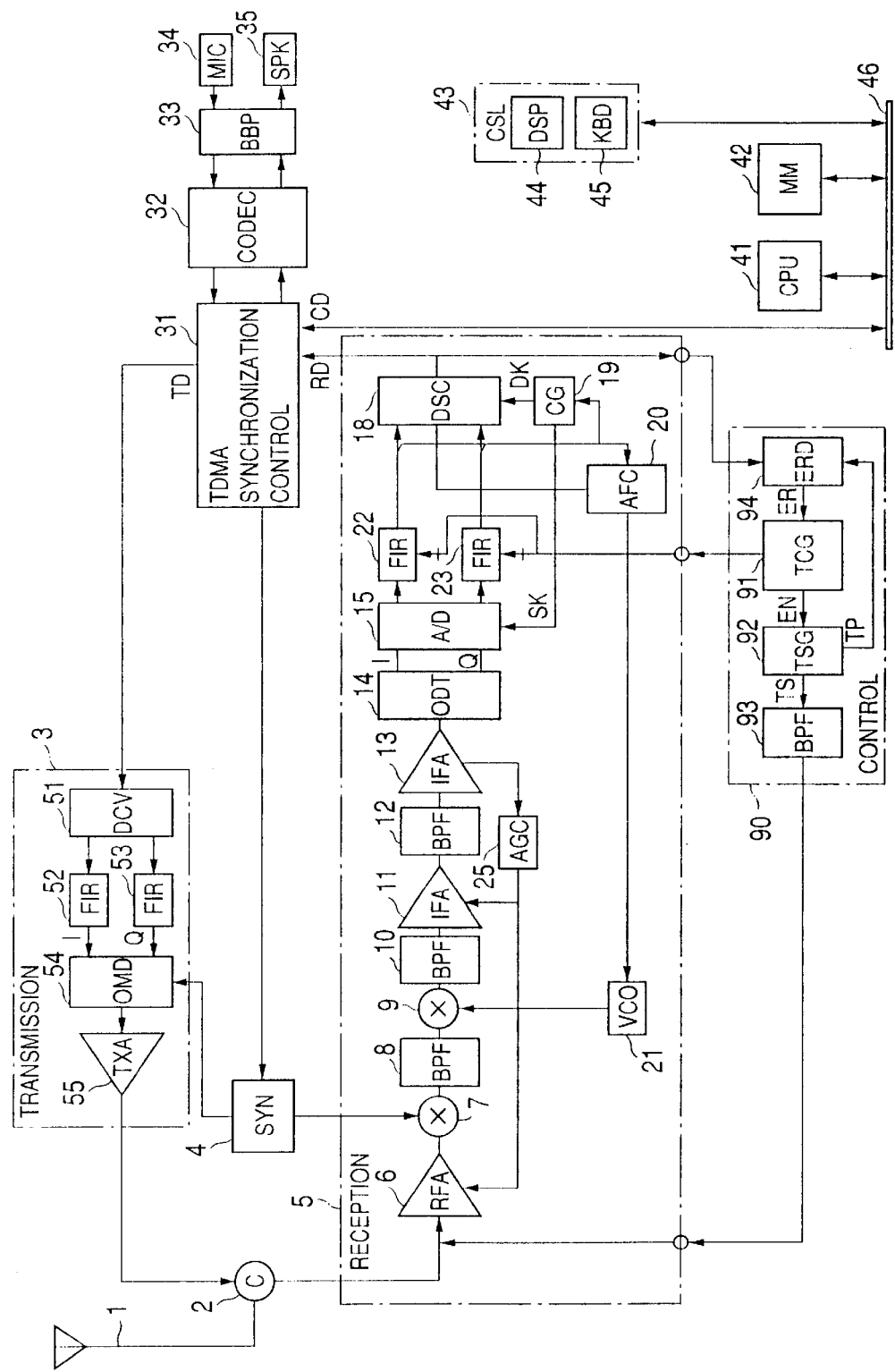
FIG. 7 shows a construction of a digital radio communication apparatus (mobile terminal) according to a first embodiment of the present invention.

FIG. 7 shows a construction of a digital radio communication apparatus (mobile terminal) according to a first embodiment of the present invention. In the apparatus of FIG. 6, the reception characteristic is variably controlled using an external control apparatus.

Figure 4:
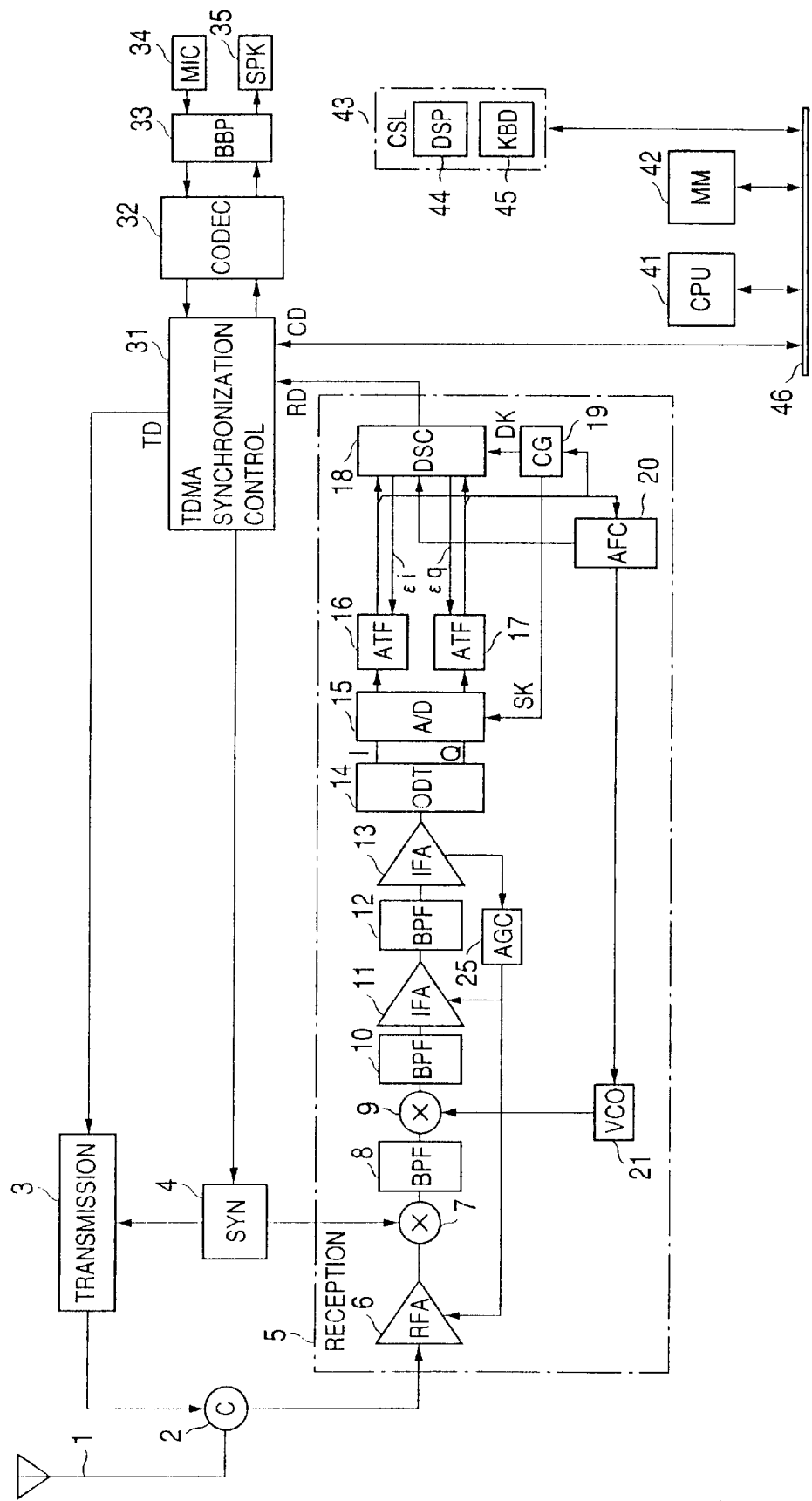
FIG. 4 shows a construction of a digital radio communication apparatus (mobile terminal) according to the related art.

Referring to FIG. 7, the apparatus comprises a transmission unit 3, including a code converter (DCV) 51 for converting transmitted data TD into code data along the quadrature I and Q axes, FIR filters 52, 53 (FIR) for implementing a transmission characteristic $G(\omega)$ shown in FIG. 1A, a quadrature modulating unit (OMD) 54 operating according to the $\pi/4$-shift QPSK method, and a transmission amplifier (TXA) 55; a reception unit 5, including FIR filters (FIR) 22, 23; and an external control apparatus 90 for controlling the reception characteristic, including a tap factor generation unit (TCG) 91 for generating a tap factor for the FIR filters 22, 23, a test signal generation unit (TSG) 92, a band-pass filter (BPF) 93, and an error detection unit (ERD) 94 for detecting an error in the received signal RD. The other aspects of the construction remain the same as the corresponding aspects of FIG. 4.

Figure 5:
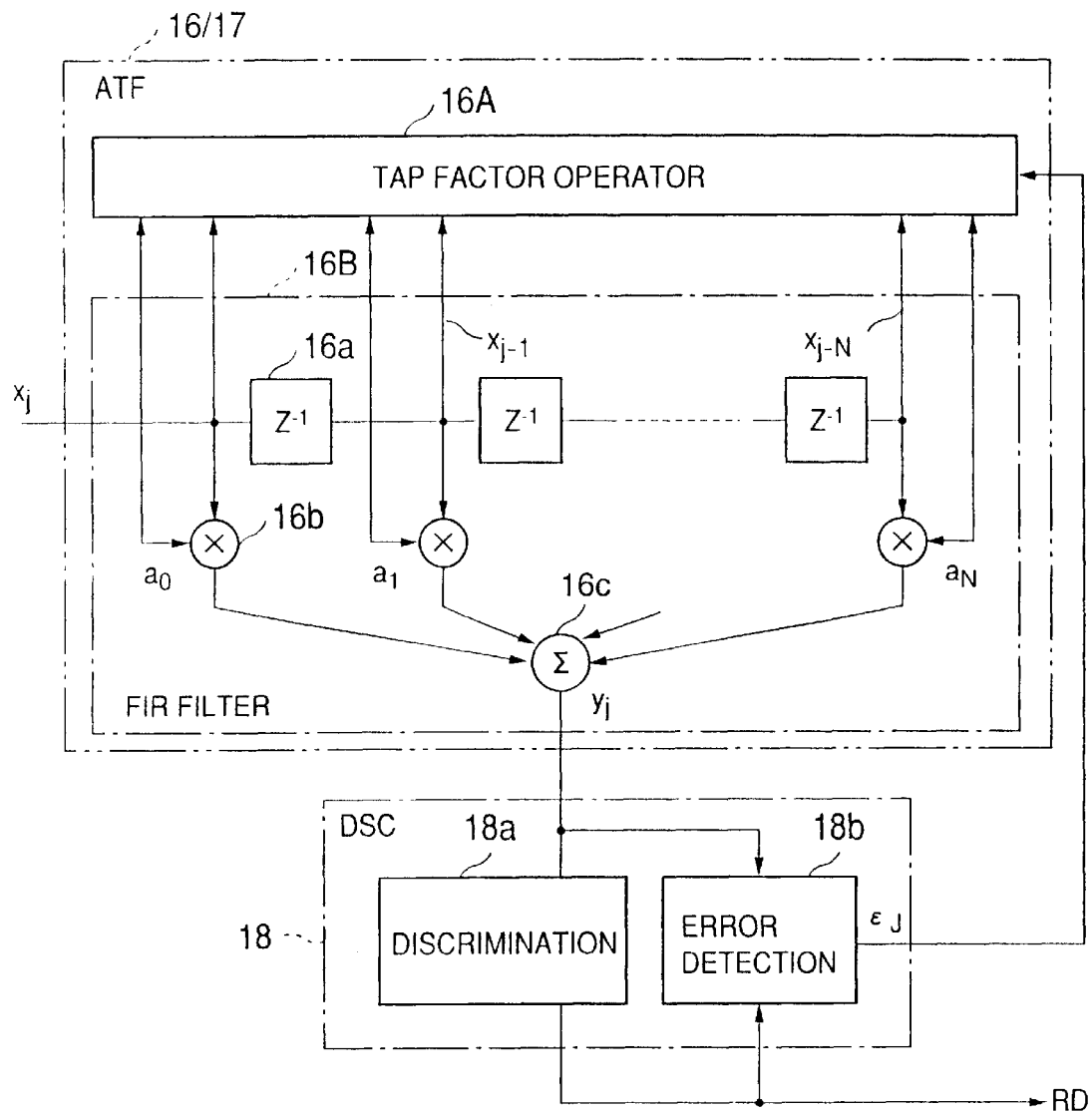
FIG. 5 shows a construction of an adaptive transversal filter according to the related art.

The FIR filters 22, 23 of the reception unit 5 have the same construction as the FIR filter 16B of FIG. 5. However, the tap factor vector TC is supplied by TCG 91 which is external to the apparatus and is latched in a non-volatile memory (not shown) within the apparatus. In the following description, BPFs 8, 10, 12 are inclusively referred to as analog filters.

Automatic control (adjustment) of the reception characteristic of the apparatus is performed such that connection terminals (indicated by circles) of the reception unit 5 are connected to the external control apparatus 90 in a fabrication process and in a control operation.

More specifically, TSG 92 is enabled (EN) by TCG 91 so as to generate a simulated RF transmission signal TS for testing the reception characteristic of the apparatus. The construction of TSG 92 may be the same as the transmission unit 3. However, TSG 92 has a built-in test signal generating unit (not shown). The transmission power of the signal TS is controlled to be sufficiently low. Preferably, BPF 93 is provided to implement the transmission characteristic $T(\omega)=T_b(\omega)T_r(\omega)$ of FIG. 1A. The transfer characteristic $F_r(\omega)$ in the air may also be implemented.

The simulated RF transmission signal TS is input to RFA 6 of the reception unit 5. Received data RD corresponding to TS is reproduced and output from the reception unit 5. ERD 94 compares the received data RD with the transmission test data TP (=TS) so as to detect a bit error rate ER. TCG 91 repeats transmission of the test data TP and detection of the associated bit error rate. For each step of the repetition, the tap factor vector TC is adaptively (in a direction of reducing the bit error rate E) updated (temporarily set) so as to generate an optimum tap factor vector TC that minimizes the bit error rate ER. The tap factor vector TC finally determined to be optimum is set in the FIR 22, 23.

FIGS. 8A–8D show a principle for controlling the reception characteristic according to the first embodiment.

Figure 8A:
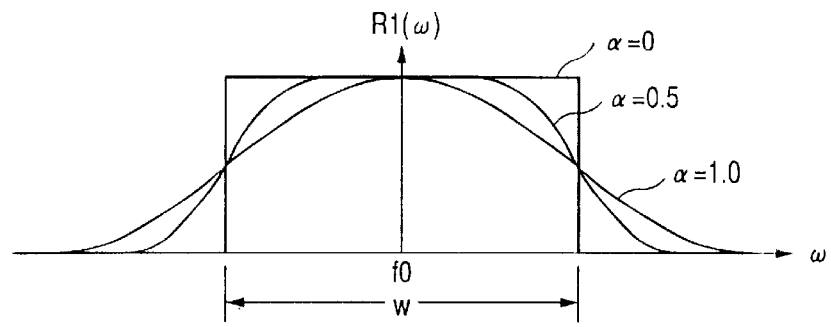
FIG. 8A shows a desired cosine roll-off characteristic for a reception unit.

FIG. 8A shows a desired cosine roll-off characteristic $R_1(\omega)$ for the reception unit 5, occurring when $\alpha=0$, $\alpha=0.5$, and $\alpha=1.0$, where $\alpha$ indicates a roll-off factor. While implementation is practically impossible for $\alpha=0$, implementation in the range $\alpha=0.2–0.8$ is possible.

For example, it is assumed that $R_1(\omega)$ for the desired roll-off factor of $\alpha=0.5$ is implemented. Assuming an analog filter transfer characteristic $A_1(\omega)$ and a FIR filter transfer characteristic $F_1(\omega)$ in the receiving system, the relation $R_1(\omega)=A_1(\omega)F_1(\omega)$ holds.

However, the transfer characteristic $A_1(\omega)$ of the analog filter of the first stage has a variation (that is, the transfer characteristic may vary from one manufactured apparatus to another, and may also vary depending on the conditions). Therefore, some typical variations $A_{11}$, $A_{12}$, ... may be selected. The transfer characteristic of the FIR filter that realizes desired $R_1(\omega)$ may be $F_{11}(\omega)$, $F_{12}$, ... that satisfy the relation $R_1(\omega)=A_{11}(\omega)F_{11}(\omega)=A_{12}(\omega)F_{12}(\omega)$ .... For other values of $\alpha$, a similar description may be applied.

Thus, assuming that $A_{11}(\omega)$ is selected, $F_{11}(\omega)$ for compensating the same is known. The tap factor vector $TC_{11}$ for realizing the known $F_{11}(\omega)$ is determined by the known Fourier series method or the like. The Fourier series method operates such that, assuming that the target transfer characteristic is $F_{11}(\omega)$ and the transfer characteristic to be implemented in the design is $D_{11}(\omega)$, the tap factor vector $TC_{11}$ of $D_{11}(\omega)$ that minimizes the error between the characteristics is obtained by using a Fourier series. The error $\epsilon$ and the ith tap factor $a_i$ are given by $$\epsilon = \int_{-\pi}^{\pi} |D_{11}(\omega) - F_{11}(\omega)|^2 d\omega$$

$$a_i = \frac{1}{2\pi} \int_{-\pi}^{\pi} F_{11}(\omega) e^{j\omega i} d\omega \quad (4)$$

Actually, the apparatus is designed using a window function.

Figure 8B:
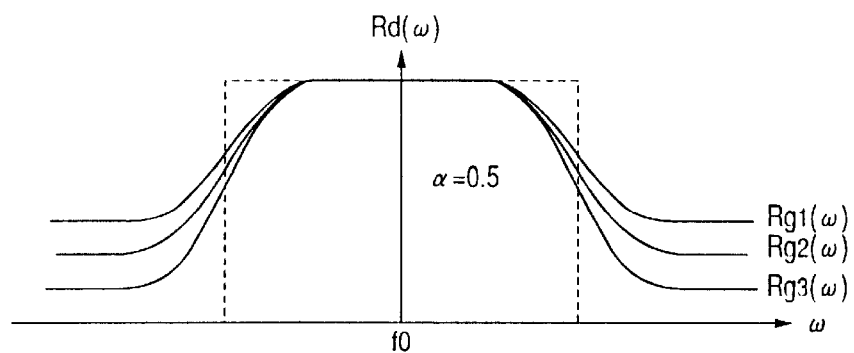
FIG. 8B shows desired attenuation characteristics of the reception unit.

FIG. 8B shows desired attenuation characteristics $R_{g1}(\omega)$ –$R_{g3}(\omega)$ of the reception unit 5. Assuming that the desired attenuation characteristic is $R_{g2}(\omega)$, several typical transfer characteristics $A_{g1}(\omega)$, $A_{g2}(\omega)$, ... may be selected in consideration of a variation of the analog filter transfer characteristic $A_g(\omega)$. Accordingly, the FIR filter transfer characteristics that realize the desired attenuation characteristic $R_{g2}(\omega)$ may be $F_{g1}(\omega)$, $F_{g2}(\omega)$, ... that satisfy $R_{g2}(\omega) = A_{g1}(\omega)F_{g1}(\omega)=A_{g2}(\omega)F_{g2}(\omega)$. Thus, the tap factor vectors $TC_{g1}$, $TC_{g2}$, ... corresponding to known $F_{g1}(\omega)$, $F_{g2}(\omega)$, ... can be determined. The attenuation characteristics $A_{g1}(\omega)$, $A_{g2}(\omega)$, ... of the analog filter may not be flat as indicated in FIG. 8B.

Figure 8C:
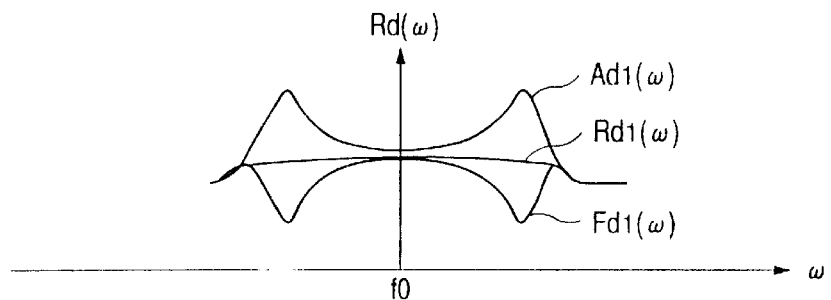
FIG. 8C shows a desired group delay characteristic of the reception unit.

FIG. 8C shows a desired group delay characteristic $R_{d1}(\omega)$ of the reception unit 5. Assuming that the group delay characteristic of the analog filter is $A_{d1}(\omega)$, the group delay characteristic of the FIR filter for realizing the group delay characteristic is $F_{d1}(\omega)$.

Figure 8D:
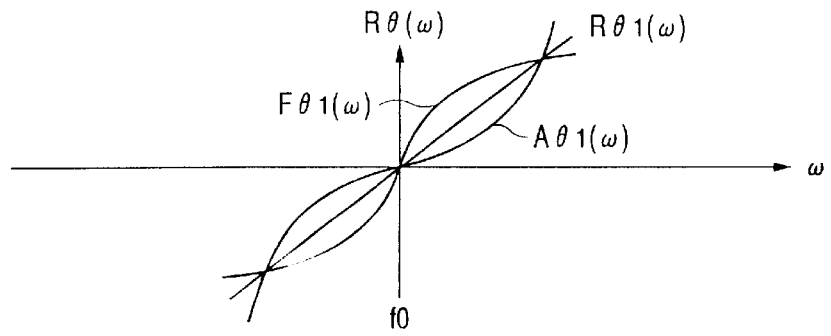
FIG. 8D shows a desired linear phase characteristic of the reception unit.

FIG. 8D shows a desired linear phase characteristic $Re_1(\omega)$ of the reception unit 5. Assuming that the analog filter phase characteristic is $A\theta_1(\omega)$, the phase characteristic of the FIR filter to realize the linear phase characteristic $R\theta_1(\omega)$ is $F\theta_1(\omega)$.

Generally, the desired correction characteristic $F(\omega)$ of the reception unit 5 is a synthesis of one or two of the characteristics $F_1(\omega)$–$F\theta(\omega)$. For example, given that the correction characteristic of the roll-off characteristic is $F_{11}(\omega)$ and the correction characteristic of the attenuation characteristic is $F_{g2}(\omega)$, the synthesized characteristic is obtained such that $F_{1g}(\omega)=F_{11}(\omega)F_{g2}(\omega)$. Thus, the correction characteristic adapted for actual variations of the analog filter is obtained. The tap factor generating unit 91 adaptively (that is, according to the principle of perturbation) selects a desired characteristic from among known characteristics $F_1(\omega)$–$F\theta(\omega)$, $F_{1g}(\omega)$ in accordance with the bit error rate ER so as to obtain the tap factor vector TC that realizes the selected characteristic by computation. Alternatively, the tap factor generating unit 91 may read out the tap factor vector TC from a ROM or the like.

The tap factor vector TC obtained by computation or stored in the ROM or the like may be tap factor vectors $TC_{11}$, $TC_{12}$ that directly correspond to $F_{11}(\omega)$, $F_{12}(\omega)$. Alternatively, it may be a transitional tap factor vector (difference between vectors) for transition from $F_{11}(\omega)$ to $F_{12}(\omega)$.

FIG. 9 is a flowchart for controlling the reception characteristic according to the first embodiment.

When the control apparatus 90 is started, the flow as shown in FIG. 9 is started. In S1, an error flag ERF and a bit error rate descent detection flag DWNF indicating a decrease in the bit error rate ER are reset. In S2, a default tap factor vector TC (for example, $\alpha=0.5$) is set in the FIR filters 22, 23. In S3, a burst of the test signal TS is transmitted. In S4, the bit error rate ER of the received data RD is detected and latched. In S5, the characteristic of the FIR filters 22, 23 is enhanced by a small increment (for example, $\alpha=0.6$ is set). In S6, the test signal TS is transmitted again. In S7, the bit error rate ER of the received data RD is detected and latched. In S8, the previous bit error rate and the current bit error rate are compared with each other so as to determine whether the bit error rate ER has increased or decreased. In the case of a decrease (including the case where the rate remains unchanged), it is determined that the characteristic is improving. In S15, the bit error rate descent detection flag DWNF is set, and the flow returns to S5.

If it is determined that the bit error rate ER has increased, it is determined that worsening of the characteristic takes place. In S9, the characteristic of the FIR filters 22, 23 is dropped by a small decrement (for example, $\alpha=0.5$ is set). In S10, the test signal TS is transmitted. In S11, the bit error rate ER for the received data RD is detected and latched. In S12, a determination is made as to whether the bit error rate has decreased. In the case of a decrease (including the case where the rate remain unchanged), it is determined that the characteristic is improving. In S16, DWNF is set, thus returning to S9.

If it is determined in S12 that the bit error rate is increasing, a determination is made in S13 as to whether DWNF=1. If DWNF=1, it is determined that worsening of the characteristic takes place after an improvement, so that, in S14, the characteristic of the FIR filters 22, 23 is returned to the immediately preceding setting, thus terminating the process. If DWNF=0, it is determined that worsening of the characteristic takes place without an improvement being detected previously. Thus, in S17, the error flag ERF is set and the process is terminated. In this case, the initial conditions may be changed, for example, so that the above process is repeated.

While the description above relates to the control of the roll-off characteristic $F_1(\omega)$, similar descriptions may also be applied to the control of the attenuation characteristic $F_g(\omega)$, the group delay characteristic $F_d(\omega)$, the phase characteristic $F\theta(\omega)$ and the synthesized characteristic $F_{1g}(\omega)$.

The adaptive control as described above is only one example. Variations may also be made. For example, a first point where a small-decrement drop (or a small-increment enhancement) of the characteristics of the FIR filter 22, 23 produces worsening of the characteristic may be determined. Subsequently, a second point where a small-increment enhancement (or a small-decrement drop) of the characteristics of the FIR filter 22, 23 produces worsening of the characteristic may be determined. The characteristic that occurs at the midpoint may be selected as the final setting.

According to the first embodiment, the deviation of the characteristic of the analog filter is adaptively compensated. The first embodiment provides ease of a controlling procedure and improvement in the yield. Additional benefits are that the size of the analog filter is reduced, the cost thereof is reduced, and the performance of the apparatus is improved thanks to optimization of the filter characteristic as a whole.

Unlike the related art which uses an adaptive transversal filter, the invention provides selective compensation and control of one or two of the characteristics because various characteristics (roll-off characteristic, attenuation characteristic and the like) constructing the reception characteristic $R(\omega)$ are clearly differentiated from each other. Further, the first embodiment provides a more stable operation of the FIR filters.

Figure 10:
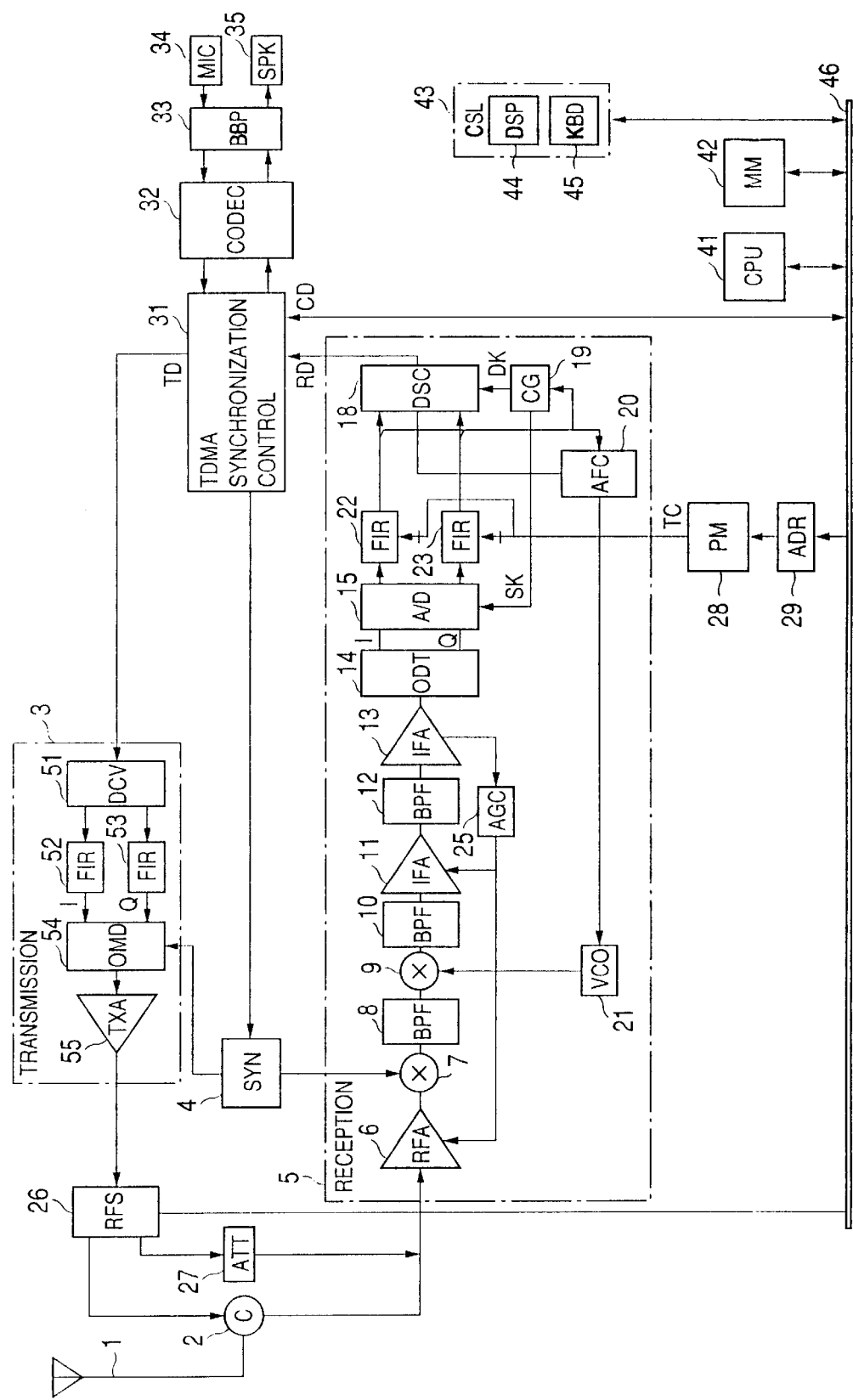
FIG. 10 shows a construction of a digital radio communication apparatus according to a second embodiment of the present invention.

FIG. 10 shows a construction of a digital radio communication apparatus according to a second embodiment of the present invention. The external control apparatus 90 as described above is built into the digital radio communication apparatus.

Referring to FIG. 10, the digital radio communication apparatus comprises an RF switch (RFS) 26, an attenuator (ATT) 27, a parameter memory (PM) 28 embodied by a non-volatile memory such as a ROM or an EEPROM, and an address register (ADR) 29.

RFS 26 switches an output from the TXA 55 to either the transmission/reception branching switch 2 or the attenuator 27. ATT 27 attenuates the output level of the TXA 55 to produce a received wave of the RFA 6. By operating the TXA 55 directly so as to reduce the output level thereof, ATT 27 can be omitted.

PM 28 stores plural predetermined sets of tap factor vectors TC for implementing the cosine roll-off characteristic $F_1(\omega)$, the attenuation characteristic $F_g(\omega)$, the group delay characteristic $F_d(\omega)$, the phase characteristic $F\theta(\omega)$ and the synthesized characteristic $F_{1g}(\omega)$, which characteristics are set in the FIR filters 22, 23 in order to compensate the characteristic of the analog filter. Each of the tap factor vectors TC is selected and read out according to the contents of ADR 29.

CPU 41 uses unoccupied time in communication to switch RFS 26 to the attenuator 27 side. CPU 41 also transmits a test signal via the TDMA synchronization controller 31 and the transmission unit 3. The test signal is not output to the antenna 1 but is input to RFA 6 via RFS 26 and ATT 27. The reception unit 5 demodulates the test signal so as to produce the received data RD. The received data RD is input to CPU 41 via the TDMA synchronization controller 31. By comparing the received data RD with the known test data TP, the bit error rate ER is determined. CPU 41 repeats transmission of the test signal and determination of the bit error rate ER. For each step of the repetition, the read address of PM 28 is adaptively changed so as to obtain, in a final stage, an optimum tap factor vector TC that minimizes the bit error rate ER. The optimum tap factor vector TC obtained in the final stage is set in the FIR filters 22, 23. Thereafter, RFS 26 is switched to the antenna 1 side. With this, communication is enabled.

By having the built-in control facilities, the digital radio communication apparatus according to the second embodiment can not only compensate a variation that occurs in the process of fabrication but can also adapt for various communization hazards during an operation. The feature of the second embodiment may also be useful for an operation not prompted by detection of communication hazards. For example, a that produces R(ω) may be controlled to be small or the attenuation characteristic may be enhanced as a precaution to prevent jamming from an adjacent channel. The characteristics may be modified in a variety of ways in accordance with the communication conditions.

Figure 11:
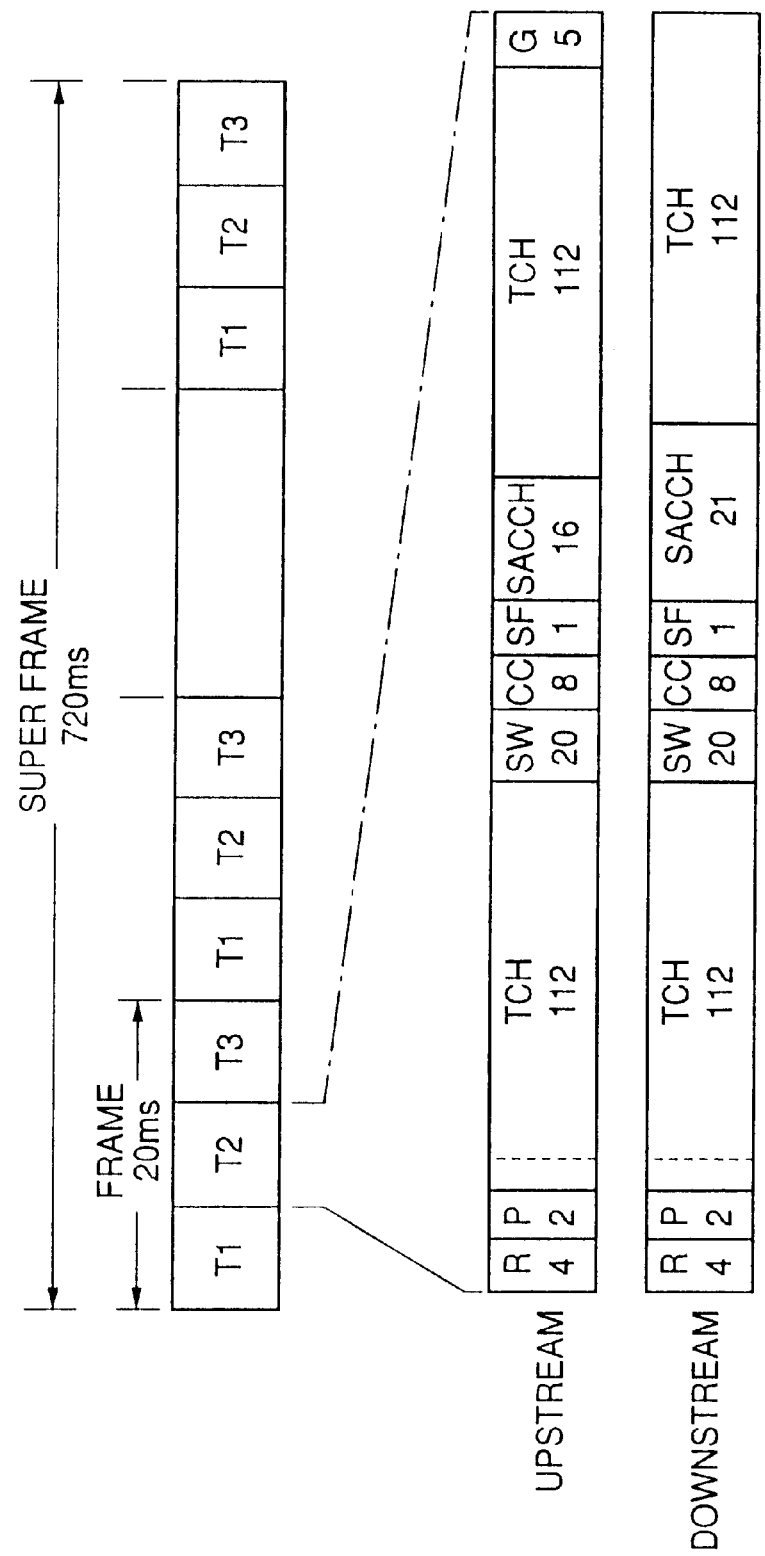
FIG. 11 shows how an error rate is determined according to a variation of the second embodiment.

FIG. 11 shows how an error rate is determined according to a variation of the second embodiment. For example, the bit error rate ER may be determined on the basis of the data received in communication.

More specifically, FIG. 11 shows a frame format of a transmitted and received frame in the TDMA (PDC) system. One upstream frame (20 ms) comprises three channels (time slots T1–T3). One superframe (720 ms) comprises 36 frames. The signal for one channel comprises guard bits R, G for burst transmission, a preamble P, communication data TCH, a synchronization word SW, a still flag SF indicating a content of TCH, a known color code CC which varies depending on frequency, and arbitrary control data SACCH. The numerals below the reference symbols indicate number of bits.

The bit error rate ER of variable data like the communication data TCH cannot be determined without a specific error checking system being introduced between a transmitter and a receiver. However, the preamble P, the synchronization word SW and the color code CC are known on the reception side as well as on the transmission side. Therefore, this information can be used to determine the bit error rate ER.

CPU 41 retrieves known bit information from the received data RD received in a wait state or in communication, so as to determine the bit error rate ER. When the determined bit error rate ER exceeds a predetermined threshold level, CPU 41 changes the characteristic of the FIR filters 22, 23 appropriately.

Figure 12:
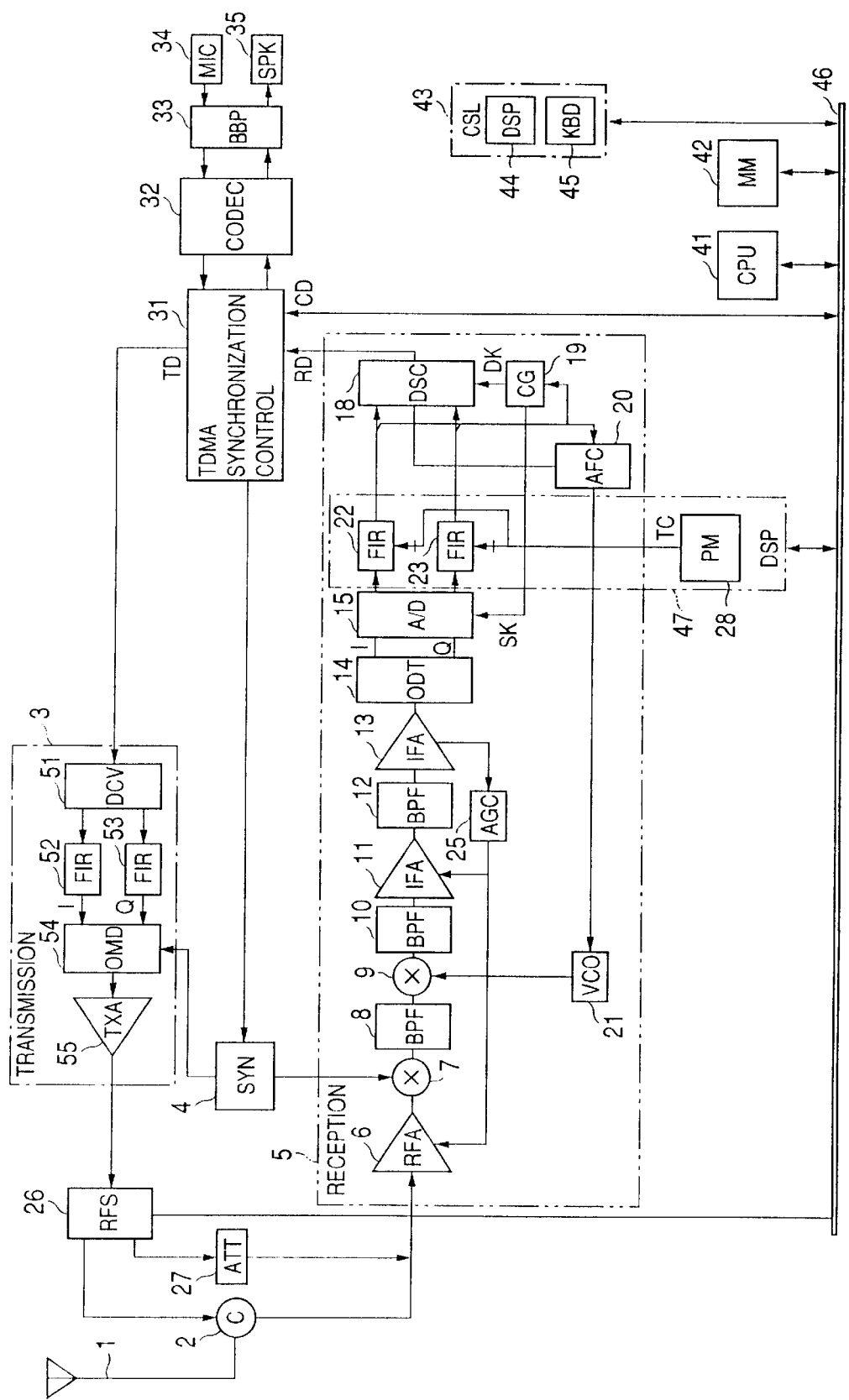
FIG. 12 shows a construction of a digital radio communication apparatus according to a third embodiment of the present invention.

FIG. 12 shows a construction of a digital radio communication apparatus according to a third embodiment of the present invention. The facilities of the FIR filters 22, 23, and the facilities for setting an optimum tap factor vector for the FIR filters 22, 23 are implemented by program means.

The facilities of the FIR filters 22, 23 are implemented by an operation described by the equation (2). The facilities for setting an optimum tap factor vector for the FIR filters 22, 23 are implemented by a process similar to the process of FIG. 9. According to the third embodiment, the facilities are split so that DSP 47 and CPU 41 perform respective facilities. For example, DSP 47 controls PM 28 so as to read tap factor vectors TC therefrom. CPU 41 is provided with facilities for transmitting a test signal, determining the bit error rate ER based on the received data RD, and adaptively controlling the FIR filters 22, 23 based on the bit error rate ER. Alternatively, as described with reference to FIG. 11, CPU 41 may be provided with facilities for determining the bit error rate ER based on the received data RD received in communication, and adaptively controlling the FIR filters 22, 23 based on the bit error rate ER.

In further accordance with the third embodiment, DSP 47 implements the operations of the FIR filters 22, 23. Distortion in the eye can be detected based on the output signals I, Q of the FIR filters 22, 23. Since the distortion of the eye is directly related to degradation in the reception, the FIR filters 22, 23 can also be adaptively controlled based on the distortion.

Figure 13A:
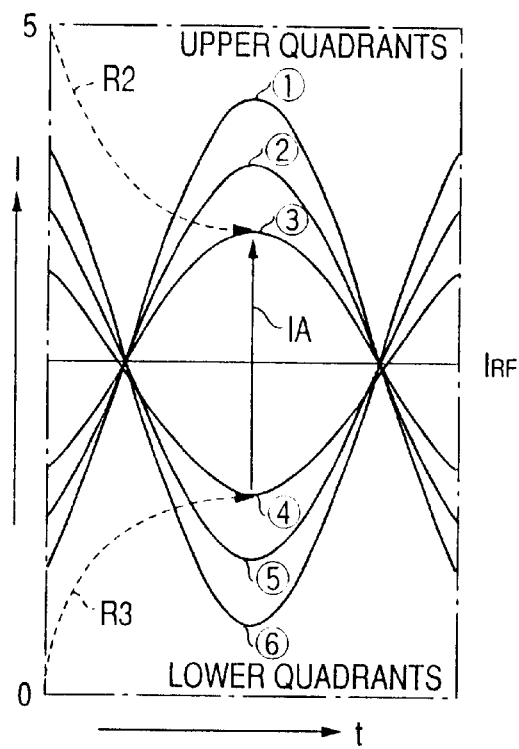
FIG. 13A shows how an eye distortion is detected based on an aperture ratio.
Figure 13B:
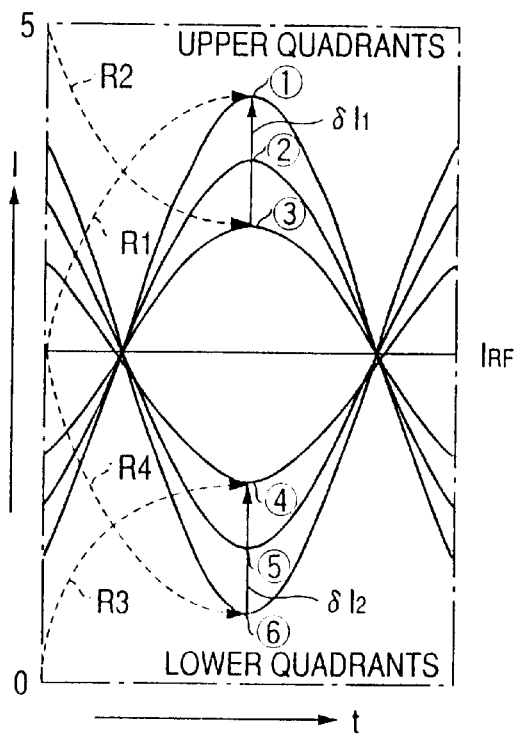
FIG. 13B shows measurement of the eye distortion based on a variation of an eye amplitude.

FIGS. 13A and 13B show a method of detecting degradation in the reception according to a variation of the third embodiment. In the illustrated method, degradation in the reception (error state) is detected based on the eye distortion.

FIG. 13A shows how the eye distortion is detected based on an aperture ratio 1A. Referring to FIG. 13A, IRF indicates a reference level which differentiates between upper quadrants and lower quadrants. (1)–(6) indicate sampling data occurring at the discrimination points. R2 indicates a register for detecting a minimum value of the input data I in the upper quadrants. R3 indicates a register for detecting a maximum value in the lower quadrants. The sampling data (1)–(6) may occur in any sequence. While FIG. 13A shows an eye pattern resulting from a variation of amplitude, an eye pattern resulting from a variation of phase also appears as a variation of amplitude.

At the outset of the detection period, R2 is preset to a maximum level of the upper quadrants, and R3 is preset to a minimum level of the lower quadrants. The subsequent input data I is compared with the reference level $I_{RF}$. When the data is in the upper quadrants, R2 is updated so as to latch the data lower in level than the previous data. When the data is in the lower quadrants, R3 is updated so as to latch the data higher in level than the previous data. Accordingly, after a predetermined period of time has elapsed, R2 latches the minimum value (3) in the upper quadrants, and R3 latches the maximum value (4) in the lower quadrants. The eye aperture ratio 1A is obtained such that IA=|(3)–(4)|. The same description also applies to the Q axis.

FIG. 13B shows measurement of the eye distortion based on a variation (variance $\delta I^1$, $\delta I_2$) of the eye amplitude. Referring to FIG. 13B, R1 indicates a register for detecting a maximum value of the input data I in the upper quadrants, and R4 indicates a register for detecting a minimum value in the lower quadrants. The operations of R2 and R3 are similar to the operations of R1 and R4, respectively. A description will now be given of the operations of R1 and R4.

At the outset of the detection period, R1 is preset to a minimum level of the upper quadrants, and R4 is preset to a maximum level of the lower quadrants. The subsequent input data I is compared with the reference level $I_{RF}$. When the data is in the upper quadrants, R1 is updated so as to latch the data higher in level than the previous data. When the data is in the lower quadrants, R4 is updated so as to latch the data lower in level than the previous data. Accordingly, after a predetermined period of time has elapsed, R1 latches the maximum value (1) in the upper quadrants, and R4 latches the minimum value (6) in the lower quadrants. The eye variation $\delta I_1$ in the upper quadrants is obtained such that $\delta I_1$=|(1)–(3)|, and the eye variation $\delta I_2$ in the lower quadrants is obtained such that $\delta I_2$=|(4)–(6)|. An average of $\delta I_1$ and $\delta I_2$ is obtained and is designated as a variation in the eye amplitude. The same description also applies to the Q axis.

While the arrangement is used to obtain the magnitude of the maximum variation of the eye, statistical variance of the eye may be obtained instead. Detection of the eye distortion may be conducted only with respect to the I axis and the Q axis. Both the eye aperture ratio and the eye variation may be used to determine the eye distortion. The above-described facilities for detecting the eye distortion can be implemented by hardware of a maximum value detection circuit and a minimum value detection circuit. The constructions of FIGS. 7 and 10 can detect the eye distortion as an error state.

Detection of the reception error state may be performed by measuring a variance ε from code points of the digital demodulated signals I and Q. The tap factor vector that minimizes $\epsilon^2$ is similar to the optimum tap factor vector in the adaptive transversal filter. The optimum tap factor vectors for a variety of analog filters are obtained so that they are adapted to FIR filters 22, 23 according to the adaptive control as described with reference to FIG. 9.

Figure 14:
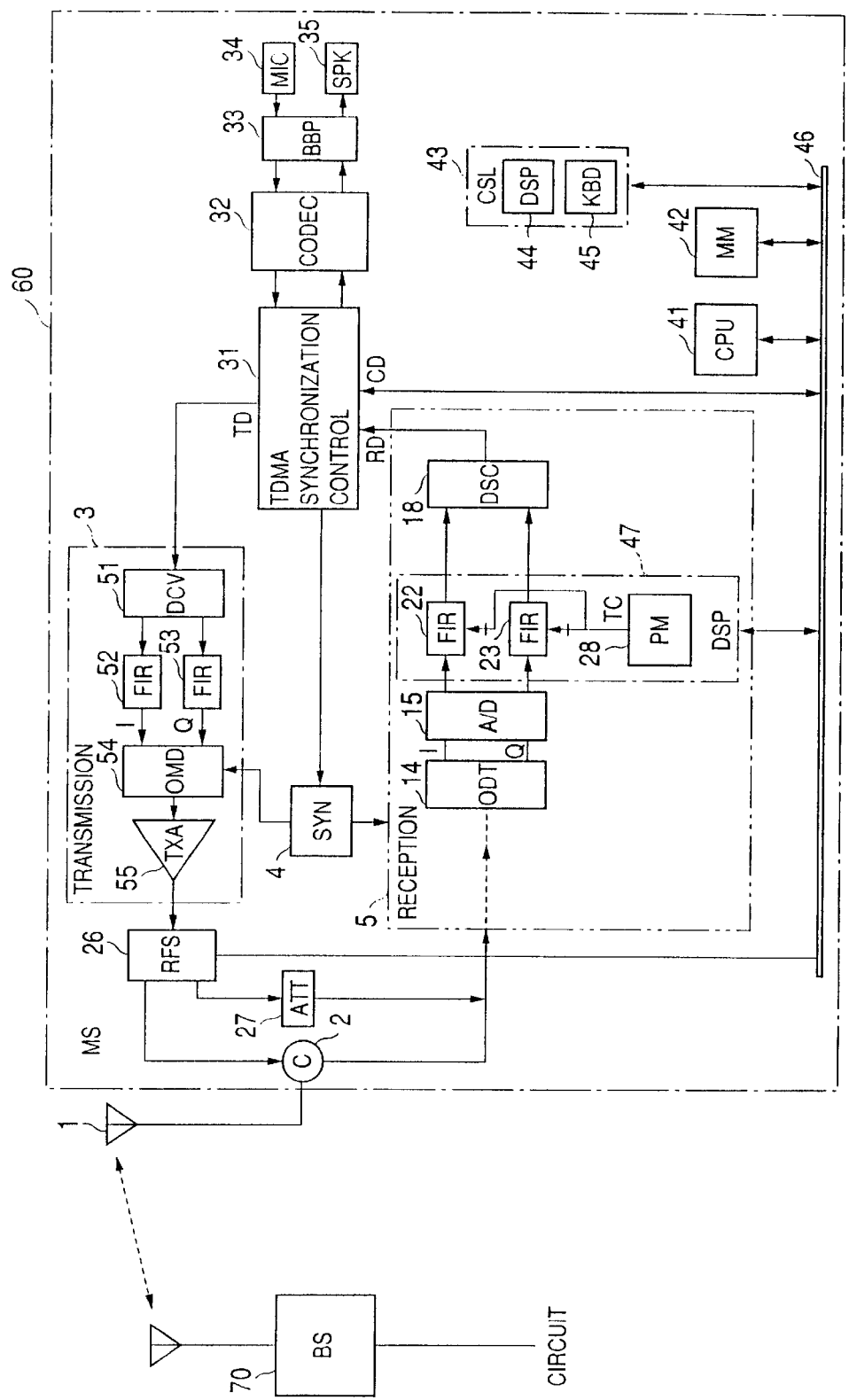
FIG. 14 shows a construction of a digital radio communication apparatus according to a fourth embodiment of the present invention.

FIG. 14 shows a digital radio communication system according to a fourth embodiment of the present invention, wherein the number of effective taps of the reception filter is varied depending on the local conditions occurring during communication. Referring to FIG. 14, the digital radio communication system comprises a base station (BS) 70, and a mobile station (MS) 60 having the construction as shown in FIG. 12. The number of effective taps of the FIR filters 22, 23 implemented by DSP 47 is configured to be variable.

For example, BS 70 transmits a control signal for controlling the reception attenuation characteristic depending on the conditions surrounding MS 60 during communication. CPU 41 receiving the control signal variably controls the number of effective taps of the FIR filters 22, 23.

More specifically, when an adjacent channel (frequency channel) to that for MS 60 is not being used, BS70 reduces the attenuation of the filter (that is, decreases the number of effective taps) so as to reduce the operation load on the DSP and decrease the delay in the received and reproduced signal. When the adjacent channel is being used, the attenuation of the filter is increased (that is, the number of effective taps is increased) so as to remove jamming from the adjacent channel.

In a type of communication in which a response is returned to be from MS 60 to BS 70 in a short period of time, the number of effective taps of the FIR filters 22, 23 is decreased so that the delay in the received and reproduced signal is improved to enable quick responses to occur.

The base station can control the performance of the mobile station in the order of priority. For example, the control of the mobile station by the base station may be based on the order of processing speed. Alternatively, if the processing speed is not a concern, the control may be based on the order of jamming removal capability.

CPU 41 uses local time slots or unoccupied time (unoccupied time slots) occurring in communication so as to temporarily reduce the attenuation provided by the FIR filters 22, 23 with respect to the adjacent channel, and to detect a current reception error state. When the adjacent channel (frequency channel) is not being used (causing no reception error), CPU 41 decreases the attenuation provided by the FIR filters 22, 23 so as to decrease the load on DSP 47 and reduce the delay in the received and reproduced signal RD. When the adjacent channel is being used (causing a reception error), CPU 41 increases the attenuation provided by the FIR filters 22, 23 so as to prevent jamming from the adjacent channels.

In this case, BPF 8, 10, 12 have a relatively large bandwidth. Further, BPF 12 may be implemented by an FIR filter 12 so that the attenuation with respect to the adjacent channels is temporarily reduced.

CPU 41 uses unoccupied time occurring in communication so as to monitor the usage of the adjacent channel (frequency channel). When the adjacent channel is not being used (no carrier is detected or received data cannot be reproduced), CPU 41 decreases the attenuation provided by the FIR filters 22, 23 so as to decrease the load on DSP 47 and reduce the delay in the received and reproduced signal RD. When the adjacent channel is being used (a carrier is detected, or received data can be reproduced), CPU 41 increases the attenuation provided by the FIR filters 22, 23 so as to prevent jamming from the adjacent channels.

Figure 15:
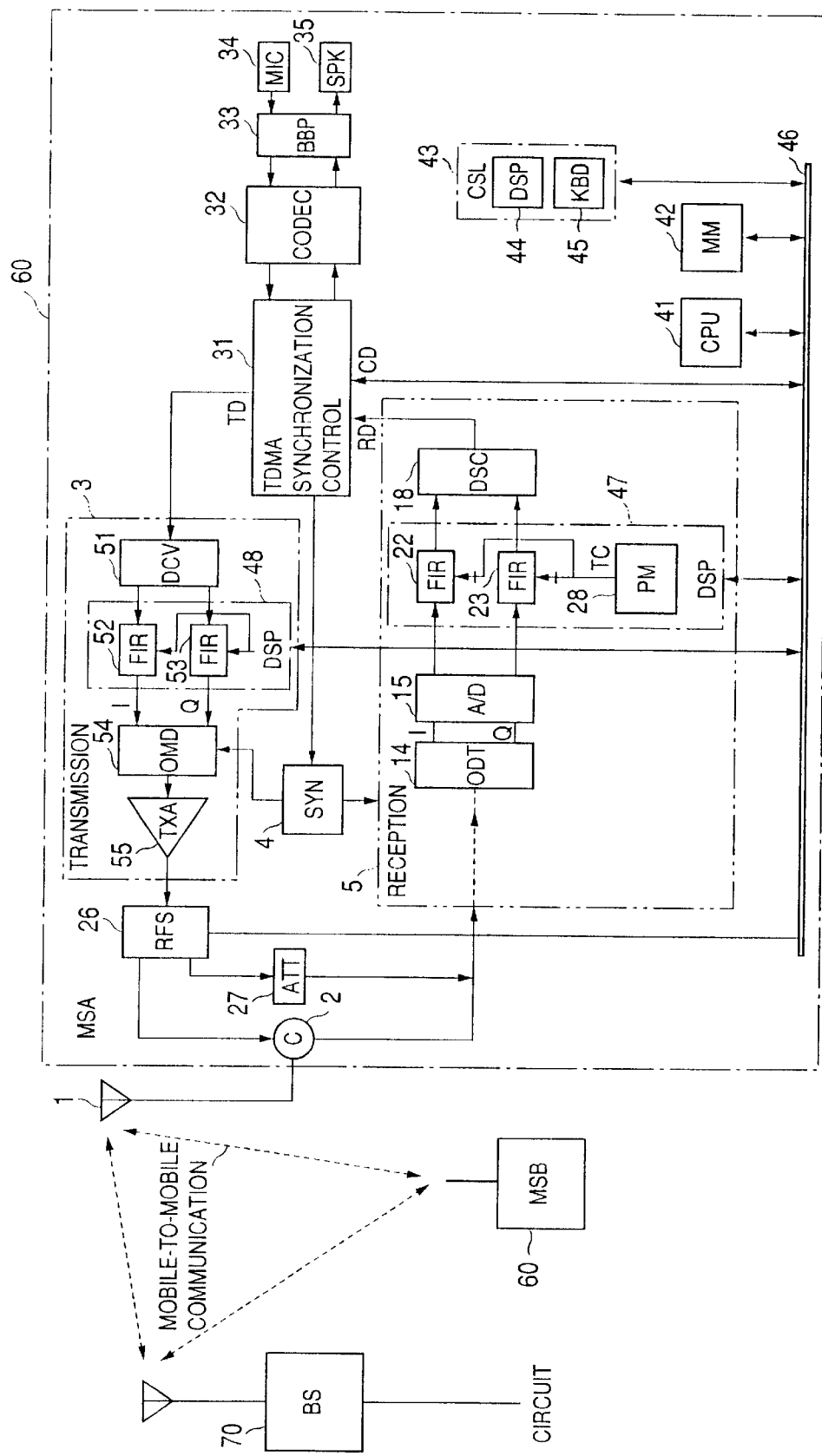
FIG. 15 shows a construction of a digital radio communication apparatus according to a fifth embodiment of the present invention.

FIG. 15 shows a digital radio communication system according to a fifth embodiment of the present invention, wherein the roll-off factor and the number of effective taps of the transmission filter and the reception filter are configured to be variable.

FIR filters 52, 53 in the transmission unit 3 are implemented by DSP 48. The roll-off factor and the number of effective taps are configured to be variable. The FIR filters 22, 23 of the reception unit 5 have the same construction.

In some types of digital mobile communication systems, when mobile stations MSA, MSB communicating with each other leave a service area of BS 70, MSA, MSB begin to communicate with each other with a proprietary frequency precision (which is lower than the precision provided by the base station). Deviation from the target transmission frequency of MSA, MSB may be such that other channels may receive jamming. According to the fifth embodiment, MSA, MSB exchange a control signal for variably controlling the roll-off characteristics (and, in addition to that, the attenuation characteristics, if necessary) of the FIR filters 52, 53, 22, 23, so as to attain a desired matching state (having an overlap with the transmission/reception bandwidth). In this way, jamming with respect to other channels is reduced and the communication between the mobile stations can proceed properly.

Figure 16:
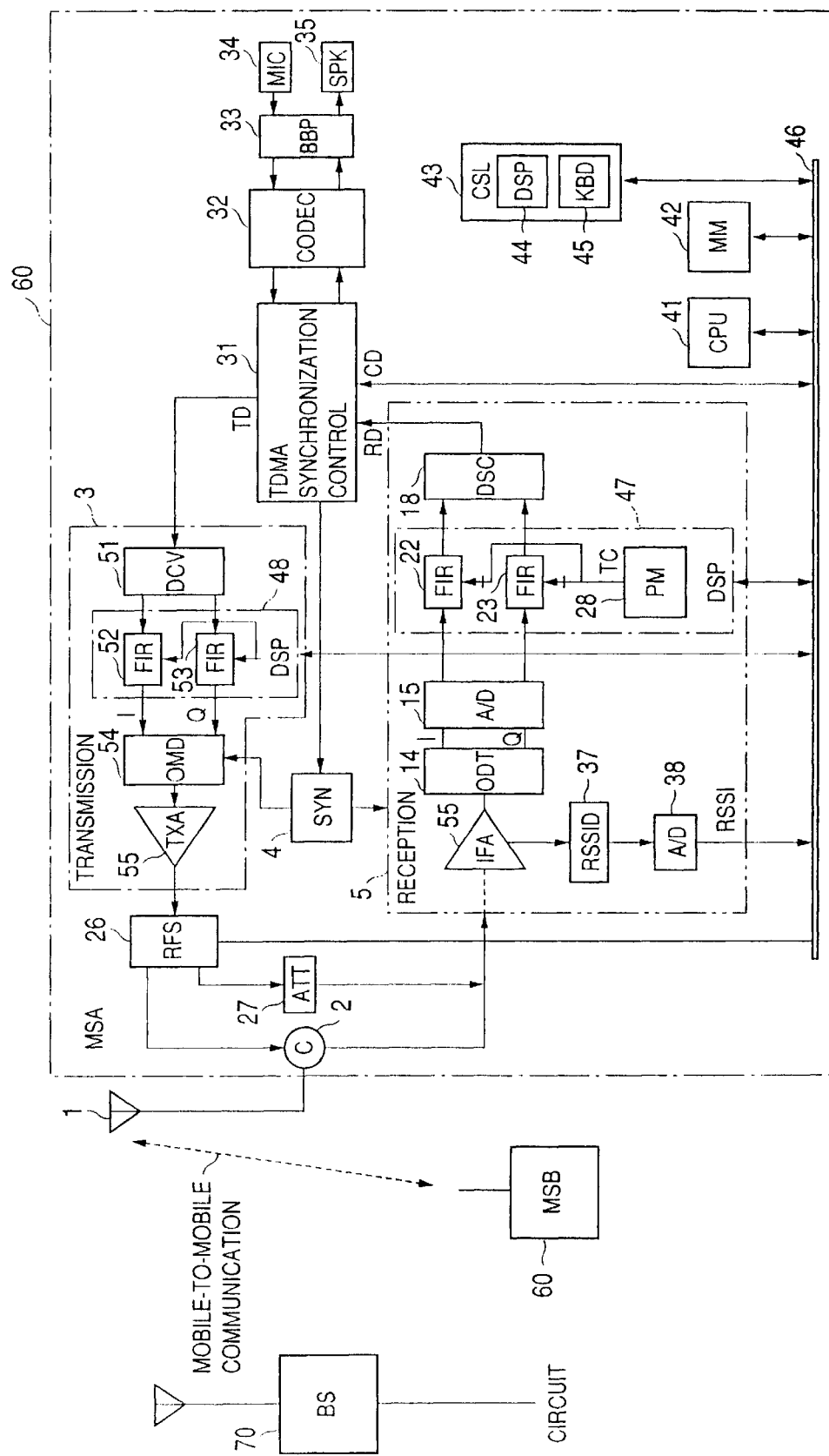
FIG. 16 shows a construction of a digital radio communication apparatus according to a sixth embodiment of the present invention.

FIG. 16 shows a construction of a digital radio communication system according to a sixth embodiment of the present invention, wherein the roll-off factor and the number of effective taps of the transmission filter and the reception filter are variably controlled depending on the reception level (RSSI).

Referring to FIG. 16, the system comprises an IF amplifier (IFA) 36, a reception level detecting unit (RSSID) 37, and an A/D converter (A/D) 38.

For example, it is assumed that MSA, MSB communicate with each other outside an area served by BS 70. When the reception level is high, it means that the distance between the two stations is small. In this case, the roll-off factor α of the FIR filters 52, 53, 22, 23 is decreased (if necessary, the attenuation characteristic may be enhanced) so as to prevent jamming with respect to other channels. When the reception level is low, it means that the two stations are removed from each other by a great distance. In this case, the roll-off factor α is increased (if necessary, the attenuation is reduced) so that the two stations can continue to communicate properly.

While it is assumed in the foregoing embodiments that an FIR filter is used as a digital filter, the present invention is equally applicable to an apparatus in which an IIR (infinite impulse response) filter is used. The transfer function of an IIR filter (standard format according to z conversion) is given by $$H(z) = \frac{a_0 + a_1 z^{-1} + a_2 z^{-2}}{1 + b_1 z^{-1} + b_2 z^{-2}} \tag{5}$$

Moreover, while the foregoing embodiments are assumed to be applied to a portable terminal operated on the TDMA system, the present invention is equally applicable to a radio communication apparatus operated on the CDMA system.

Application of the present invention is not limited to portable terminals but may be extended to various types of digital radio communication apparatuses (a base station, a radio repeater station, an earth station and a substation).

The present invention is not limited to the above-described embodiments, and variations and modifications may be made without departing from the scope of the present invention.

What is claimed is:

1. In a combination of a digital radio communication apparatus and a control unit for compensating distortion characteristics in the apparatus, the apparatus comprising:

a radio wave transmission unit for transmitting a radio wave; and a radio wave reception unit for receiving a radio wave and demodulating the same, said reception unit comprising:

an analog filter provided in a first stage of said reception unit;

a digital filter provided in a second stage of said reception unit so as to compensate a characteristic of said analog filter by having a filter characteristic of said digital filter varied by varying a tap factor;

an RF signal terminal for inputting and outputting a test RF signal;

a tap factor terminal for inputting and outputting a tap factor of said digital filter; and a digital demodulated signal terminal for inputting and outputting a digital demodulated signal produced by said reception unit; and the control unit being arranged externally of said apparatus and being coupled to said reception unit to provide said test RF signal and said tap factor to said reception unit to perform equalization adjustment of said digital filter to compensate for a characteristic of said analog filter.

2. A method of controlling a digital radio communication apparatus, comprising the steps of:

a) supplying a test RF signal to an RF signal terminal of a radio wave reception unit having an analog filter and a digital filter coupled to said analog filter;

b) detecting an error occurring in a digital demodulated signal derived from the test RF signal;

c) temporarily setting a tap factor of said digital filter that reduces a level of the error;

d) repeating steps a)–c) so as to determine a target tap factor that minimizes the error, and setting the target tap factor in said digital filter to thereby perform equalization adjustment of said digital filter to compensate for a characteristic of said analog filter.

3. The method of controlling a digital radio communication apparatus as claimed in claim 2, wherein the error is related to one of the following:

a bit error rate of a digital reproduced signal;

degradation in an eye pattern of a digital demodulated baseband signal; and deviation from code points of the digital demodulated baseband signal.

4. In a combination of a digital radio communication apparatus and a control unit for compensating distortion characteristics in the apparatus; said apparatus comprising:

a radio wave transmission unit for transmitting a radio wave; and a radio wave reception unit for receiving a radio wave and demodulating the same, said reception unit comprising:

an analog filter provided in a first stage of said reception unit, and a digital filter provided in a second stage of said reception unit so as to compensate a characteristic of said analog filter by having a fiter characteristic of said digital filter varied by varying a tap factor;

said control unit being arranged externally of said apparatus and being coupled to said reception unit said control unit comprising:

a test signal generation unit for supplying a test signal to said reception unit;

an error state detection unit for detecting an error based on a digital demodulated signal derived from the test signal; and a tap factor setting unit for temporarily setting a tap factor of said digital filter that reduces a level of the error; wherein supplying of the test signal and detecting of the error are repeated until a target tap factor that minimizes the error is determined, whereupon the target tap factor is set in said digital filter.

5. The combination as claimed in claim 4, wherein said transmission unit subjects a data signal originated in the digital radio communication apparatus to digital modulation before transmission, and a test data signal generated by the test signal generation unit is subjected to digital modulation via said transmission unit and is supplied to an RF signal terminal of said reception unit.

6. The combination as claimed in claim 5, further comprising a call controller for controlling incoming calls and outgoing calls, wherein said call controller provides facilities of one of the test signal generation unit and said error state detection unit.

7. The combination as claimed in claim 4, wherein an algorithm is used for optimizing said digital filter by said tap factor setting unit to produce the best evaluation of the result of setting until the optimum tap factor is finally determined.

8. The combination as claimed in claim 4, wherein the tap factor of said digital filter is to compensate one or a plurality of the following characteristics:

a roll-off characteristic of said analog filter;

an attenuation characteristic of said analog filter;

a group delay characteristic of said analog filter; and a phase characteristic of said analog filter.

9. The combination as claimed in claim 8, wherein a plurality of tap factors are stored in a memory.

10. The combination as claimed in claim 9, wherein a digital signal processor implements facilities of said digital filter and facilities of the memory storing the plurality of tap factors.

11. The combination as claimed in claim 10, wherein a program control of the digital signal processor implements facilities of said error state detection unit and facilities of said tap factor setting unit.

12. A digital radio communication apparatus comprising:

a transmission unit for transmitting a radio wave; and a reception unit for receiving a radio wave and demodulating the same, said reception unit comprising:

an analog filter provided in a first stage of said reception unit;

a digital filter provided in a second stage of said reception unit so as to compensate a characteristic of said analog filter by having a filter characteristic of said digital filter varied by varying a tap factor; and a control unit which comprises:

an error state detection unit for detecting an error based on a digital demodulated signal from said reception unit; and a tap factor setting unit for temporarily setting a tap factor of said digital filter that reduces a level of the error;

said control unit being built in said apparatus to perform equalization adjustment of said digital filter to compensate for a characteristic of said analog filter when said apparatus is not in use, wherein setting of the tap factor and detecting of the error are repeated until a target tap factor that minimizes the error is determined, whereupon the target tap factor is set in said digital filter.

13. The digital radio communication apparatus as claimed in claim 12, further comprising a call controller for controlling incoming calls and outgoing calls, wherein said call controller provides facilities of one of the tap factor setting unit and said error state detection unit.

14. The digital radio communication apparatus as claimed in claim 12, wherein an algorithm is used for optimizing said digital filter by said tap factor setting unit to produce the best evaluation of the result of setting until the optimum tap factor is finally determined.

15. The combination as claimed in claim 4, wherein the error is related to one of the following:
   a bit error rate of a digital reproduced signal
   degradation in an eye pattern of a digital demodulated baseband signal; and
   deviation from code points of the digital demodulated baseband signal.

16. The digital radio communication apparatus as claimed in claim 12, wherein the error is related to one of the following:
   a bit error rate of a digital reproduced signal;
   degradation in an eye pattern of a digital demodulated baseband signal; and
   deviation from code points of the digital demodulated baseband signal.

17. The digital radio communication apparatus as claimed in claim 12, wherein the tap factor of said digital filter is to compensate one or a plurality of the following characteristics:
   a roll-off characteristic of said analog filter;
   an attenuation characteristic of said analog filter;
   a group delay characteristic of said analog filter; and
   a phase characteristic of said analog filter.

18. The digital radio communication apparatus as claimed in claim 17, wherein a plurality of tap factors are stored in a memory.

19. The digital radio communication apparatus as claimed in claim 18, wherein a digital signal processor implements facilities of said digital filter and facilities of the memory storing the plurality of tap factors.

20. The digital radio communication apparatus as claimed in claim 19, wherein a program control of the digital signal processor implement facilities of the error state detection unit and facilities of said tap factor setting unit.

21. A digital mobile radio communication apparatus for performing communication via a base station of a digital mobile communication system, said digital mobile radio communication apparatus comprising:
   a radio wave transmission unit for transmitting a radio wave; and
   a radio wave reception unit for receiving a radio wave and demodulating the same, said reception unit comprising:
      an analog filter provided in a first stage of said reception unit;
      a digital filter provided in a second stage of said reception unit so as to compensate a characteristic of said analog filter by having a filter characteristic of said digital filter varied by varying a tap factor; and
      a variable tap count control unit for variably controlling the number of effective taps of said digital filter depending on conditions that occur in communication, wherein said variable tap count control unit temporarily reduces attenuation provided by said digital filter with respect to an adjacent channel so as to detect a current reception state, and updates the number of effective taps of said digital filter depending on a result of the detection.

22. A digital mobile radio communication apparatus for performing communication via a base station of a digital mobile communication system, said digital mobile radio communication apparatus comprising:
   a transmission unit for transmitting a radio wave; and
   a reception unit for receiving a radio wave and demodulating the same, said reception unit comprising:
      an analog filter provided in a first stage of said reception unit:
      a digital filter provided in a second stage of said reception unit so as to compensate a characteristic of said analog filter by having a filter characteristic of said digital filter varied by varying a tap factor:
      a variable tap count control unit for variably controlling the number of effective taps of said digital filter depending on conditions that occur in communication;
      a monitoring control unit for monitoring a usage of a bandwidth for an adjacent channel, using unoccupied time in communication, wherein
         said variable tap count control unit updates the number of effective taps of said digital filter depending on a result of the monitoring by said monitoring control unit.

\* \* \* \* \*